US012776565B2

(12) United States Patent
Hu et al.

(10) Patent No.: US 12,776,565 B2
(45) Date of Patent: Oct. 27, 2026

(54) FOLDABLE ELECTRONIC DEVICE INCLUDING ANTENNA

(71) Applicant: Honor Device Co., Ltd., Shenzhen (CN)

(72) Inventors: Yiwu Hu, Shenzhen (CN); Aofang Zhang, Shenzhen (CN); Kunpeng Wei, Shenzhen (CN); Qiao Guan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 106 days.

(21) Appl. No.: 18/840,741

(22) PCT Filed: May 6, 2023

(86) PCT No.: PCT/CN2023/092410
§ 371 (c)(1),
(2) Date: Aug. 22, 2024

(87) PCT Pub. No.: WO2024/027247
PCT Pub. Date: Feb. 8, 2024

(65) Prior Publication Data

US 2025/0202095 A1 Jun. 19, 2025

(30) Foreign Application Priority Data

Aug. 3, 2022 (CN) ......................... 202210926607.7

(51) Int. Cl.
*H01Q 1/22* (2006.01)
*H01Q 13/10* (2006.01)

(52) U.S. Cl.
CPC ........... *H01Q 1/2266* (2013.01); *H01Q 13/10* (2013.01)

(58) Field of Classification Search
CPC ...... H01Q 1/2258; H01Q 1/2266; H01Q 1/36; H01Q 1/50; H01Q 13/10; H01Q 13/16; H01Q 21/00; H01Q 21/28
See application file for complete search history.

(56) References Cited

U.S. PATENT DOCUMENTS 11,539,114 B2 12/2022 Hsu et al.
2013/0285865 A1 10/2013 Lo Hine Tong et al.
(Continued)

FOREIGN PATENT DOCUMENTS

CN 202633501 U 12/2012
CN 103597661 A 2/2014
(Continued)

*Primary Examiner* — Hoang V Nguyen
(74) *Attorney, Agent, or Firm* — Slater Matsil, LLP

(57) ABSTRACT

Embodiments of this application provide a foldable electronic device including an antenna. The foldable electronic device include a first body, a second body, and a rotating shaft connected to the first body and the second body. The first body and the second body are rotatable around the rotating shaft. As the first body and the second body rotate, a form of the foldable electronic device may be switched between a folded state and an unfolded state. The antenna may be a slot antenna formed by hollowing out a metal housing of the first body or a metal housing of the second body. The slot antenna may include a first branch and a second branch, where the first branch and the second branch may be perpendicular to each other. This can reduce the antenna directivity coefficient, improve an antenna radiation pattern, and improve a signal coverage capability of the electronic device.

20 Claims, 30 Drawing Sheets

(56) References Cited

U.S. PATENT DOCUMENTS

| | | | | |
|---|---|---|---|---|
| 2015/0295303 | A1 | 10/2015 | Lee et al. | |
| 2018/0342809 | A1 | 11/2018 | Wu et al. | |
| 2019/0181891 | A1 | 6/2019 | Harper | |
| 2021/0359393 | A1* | 11/2021 | Hsu | H01Q 1/243 |
| 2023/0344128 | A1 | 10/2023 | Wu | |

FOREIGN PATENT DOCUMENTS

| | | | |
|---|---|---|---|
| CN | 111949070 | A | 11/2020 |
| CN | 112201958 | A | 1/2021 |
| CN | 112751203 | A | 5/2021 |
| CN | 113675588 | A | 11/2021 |
| CN | 217215072 | U | 8/2022 |
| CN | 115224467 | A | 10/2022 |
| JP | 2006042042 | A | 2/2006 |

* cited by examiner

FOLDABLE ELECTRONIC DEVICE INCLUDING ANTENNA

CROSS-REFERENCE TO RELATED APPLICATIONS

This application is a national stage of International Application No. PCT/CN2023/092410, filed on May 6, 2023, which claims priority to Chinese Patent Application No. 202210926607.7, filed on Aug. 3, 2022. The disclosures of both of the aforementioned applications are hereby incorporated by reference in their entireties.

TECHNICAL FIELD

This application relates to the field of antenna technologies, and in particular, to a foldable electronic device including an antenna.

BACKGROUND

A light and thin personal computer (personal computer, PC) with a full metal industry design (industry design, ID) includes two large ground plates, namely, a housing of a screen side and a housing of a keyboard side. In addition, a thickness of the entire computer is small, and consequently internal space reserved for antenna design is small, which brings new challenges to antenna design.

SUMMARY

Various embodiments of this application provide a foldable electronic device including an antenna, where the antenna is not limited by limited internal space, an antenna directivity coefficient is low, and a signal coverage capability is good.

The foldable electronic device provided in various embodiments of this application may include a first body, a second body, and a rotating shaft connected to the first body and the second body, where the first body and the second body are rotatable around the rotating shaft. The first body may include a metal housing 14, and the housing 14 may be referred to as a first housing. The second body may include a metal housing 16, and the housing 16 may be referred to as a second housing.

The foldable electronic device may further include a slot antenna formed by hollowing out a housing ground plate, where the slot antenna may include a first branch and a second branch, the second branch is vertically connected to one end of the first branch, and a feed point of the slot antenna is disposed on one of the branches.

In this way, because the first branch and the second branch are perpendicular to each other, a horizontal current and a vertical current that are on the housing ground plate may be excited, and the horizontal current and the vertical current jointly generate radiation. This can effectively reduce the antenna directivity coefficient, improve an antenna radiation pattern, and improve a signal coverage capability of the foldable electronic device.

The slot antenna is distributed in an area that is on the housing ground plate and that is adjacent to a folding position. The folding position of the foldable electronic device is not covered by an input/output panel with a signal shielding feature, for example, a display, so that the area that is on the housing ground plate and that is adjacent to the folding position is not opposite to the display, to prevent the display from shielding an antenna radiation signal. The folding position may be a position through which an axis of the rotating shaft passes, and may be externally represented as a position of a crease or seam. The area adjacent to the folding position may mean that a gap between a point that is in the area and that is farthest from the folding position and the folding position does not exceed a specific distance value, for example, 25 mm, 30 mm, or the like.

Further, an antenna branch layout on the housing ground plate may be considered as follows: The first branch and the second branch are not distributed along a side edge of the housing ground plate at the same time. In this way, it is avoided that the horizontal current that is of the ground plate and that is excited by a vertical branch distributed along a vertical side edge of the ground plate is distributed on both sides of the vertical branch in an unbalanced manner, to avoid that antenna radiation is distributed in a horizontal direction in an unbalanced manner, so that a directivity coefficient of the slot antenna is prevented from increasing.

When one of the first branch and the second branch is distributed along the side edge of the housing ground plate, a gap between the other branch and the side edge of the housing ground plate is not less than a specific distance value, for example, ½ operating wavelength.

Further, a size of the antenna branch may be considered as follows: When the antenna branch distributed along the longer side edge is longer, balancing between the horizontal current and the vertical current of the ground plate is facilitated. In addition, a length difference between the two antenna branches should not be significant, and the length difference may adapt to a difference between a length that is of the housing ground plate and that is in the horizontal direction and a length that is of the housing ground plane and that is in the vertical direction. Specifically, a difference between a ratio of a length of one branch to a length of the other branch and a ratio of a length of a longer side edge of the housing ground plate to a length of a shorter side edge of the housing ground plate does not exceed a first value.

Based on the foregoing foldable electronic device, in a first possible implementation, the first housing and the second housing may be two independent metal housings. On an outer side of the rotating shaft, the rotating shaft is connected to the housing 14 and the housing 16 to form an open slot 71A and an open slot 71B that are closed at one end and open at the other end. In addition, when the foldable electronic device is in an unfolded state, the slot 71A and the slot 71B still exist. In this case, the housing 14 and the housing 16 are not in contact with each other on the outer side of the rotating shaft.

Based on the foregoing foldable electronic device, in a second possible implementation, the first housing and the second housing may be two independent metal housings. When the foldable electronic device is in an unfolded state, the slot 71A and the slot 71B disappear, and the housing 14 and the housing 16 can be in contact with each other and form a short circuit on the outer side of the rotating shaft. In this case, the housing 14 and the housing 16 are equivalent to an integrated ground plate formed on the outer side of the rotating shaft.

Based on the foregoing foldable electronic device, in a third possible implementation, the housing 14 and the housing 16 may be two parts of one entire metal housing, and the entire metal housing is rotatable around the rotating shaft and bendable at the folding position. In this case, on the outer side of the rotating shaft, the housing 14 and the housing 16 are naturally short-circuited because they are integrated. The housing ground plate is the entire metal housing.

Based on the foregoing first possible implementation, further, the slot antenna may be distributed in the area that is on the housing ground plate and that is adjacent to the folding position, and the first branch is selected to be distributed along the folding position. That the antenna branch is distributed along the folding position may include: The antenna branch is distributed along a housing side edge connected to the rotating shaft. The housing side edge connected to the rotating shaft is a position that is on the housing ground plate and that is nearest to the folding position. When the first branch is selected to be distributed along the housing side edge connected to the rotating shaft, a distance between the second branch and the side edge of the housing is not less than ½ operating wavelength, so that the horizontal current and the vertical current of the housing ground plate are excited in a balanced manner.

Based on the foregoing second possible implementation, further, the slot antenna may be distributed in the area that is on the housing ground plate and that is adjacent to the folding position. Specifically, the first branch may be selected to be distributed along the folding position. That the antenna branch is distributed along the folding position may include: The antenna branch is distributed along the housing side edge connected to the rotating shaft. When the first branch is selected to be distributed along the housing side edge connected to the rotating shaft, the second branch may also be distributed along the side edge of the housing and not far away from the side edge of the housing. Because, when the foldable electronic device is in the unfolded state, the housing 14 and the housing 16 can be in contact with each other and form a short circuit on the outer side of the rotating shaft, and therefore an antenna boundary condition changes. It is equivalent to that, in this case, the first branch is no longer distributed along the side edge of the housing ground plate, only the second branch is distributed along the side edge of the housing ground plate, antenna radiation is balanced, and an antenna directivity coefficient is relatively low.

Based on the foregoing third possible implementation, further, the slot antenna may be distributed in a bending area of the entire metal housing. Specifically, the first branch or the second branch may be selected to be distributed along the folding position. When one of the two antenna branches is provided along the folding position, the other antenna branch may be provided along the side edge of the housing ground plate, or the other antenna branch may be provided far away from the side edge of the housing ground plate.

Based on a plurality of foregoing possible implementations, further, the rotating shaft may be made of metal. In this case, the slot antenna may further be distributed on the outer side of the rotating shaft, so that it is avoided that a long slot between two or more rotating shafts generates radiation.

Based on a plurality of foregoing possible implementations, further, the slot antenna may further include a third branch formed by hollowing out the housing ground plate, where the third branch may be vertically connected to the other end of the first branch, and a gap between the feed point and the third branch may be less than a second value, for example, 5 mm.

Based on a plurality of foregoing possible implementations, further, the slot antenna may further include a slot formed through slotting at a first position of the first branch, where an inductor is loaded in the slot, and the first position includes a strong current point of a first resonance frequency of the slot antenna. At a position of a strong current point of one resonance frequency, slotting is performed and an inductor is loaded, so that a resonance position of the resonance frequency can be changed effectively, and a tuning objective can be achieved. The strong current point may be one position range with high current intensity (for example, the current intensity exceeds a specific intensity value). During selecting a slotting position, a strong current point of another resonance frequency needs to be considered to avoid, to avoid affecting radiation of the slot antenna at the another resonance frequency.

In the foldable electronic device described in the foregoing content, there may be a plurality of slot antennas, to implement a MIMO antenna, for example, a Wi-Fi MIMO antenna. In a possible implementation, a quantity of slot antennas is specifically two, one slot antenna is provided on a first outer side of the rotating shaft, and the other slot antenna is provided on a second outer side of the rotating shaft.

BRIEF DESCRIPTION OF THE DRAWINGS

To describe the technical solutions in embodiments of this application more clearly, the following describes the accompanying drawings required in embodiments of this application.

DETAILED DESCRIPTION OF ILLUSTRATIVE EMBODIMENTS

The following describes embodiments of this application with reference to the accompanying drawings.

A foldable electronic device including an antenna provided in embodiments of this application may provide a wireless communication service by using an antenna, and may use one or more of the following communication technologies: a global system for mobile communications (global system for mobile communication, GSM) technology, a code division multiple access (code division multiple access, CDMA) communication technology, a wideband code division multiple access (wideband code division multiple access, WCDMA) communication technology, a general packet radio service (general packet radio service, GPRS), a long term evolution (long term evolution, LTE) communication technology, a Wi-Fi communication technology, a 5G communication technology, a millimeter wave (mmWave) communication technology, a SUB-6G communication technology, another future communication technology, and the like. The following embodiments do not highlight a requirement of a communication network, and describe an operating feature of an antenna based on a frequency band.

The foldable electronic device including an antenna provided in embodiments of this application may be bent or folded.

Figure 1A:
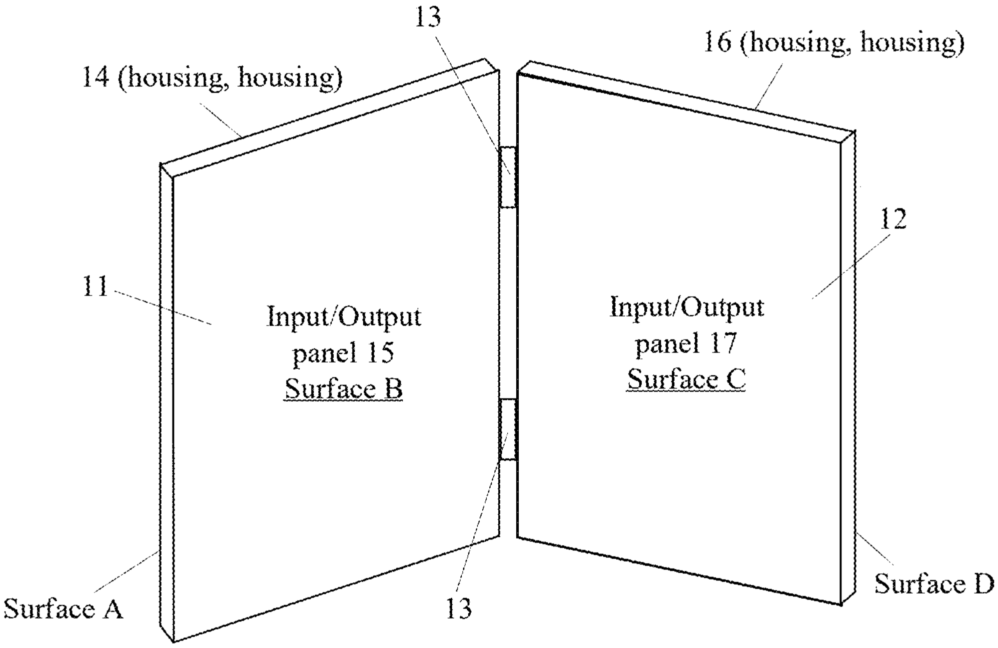
FIG. 1A shows an electronic device including an antenna according to an embodiment of this application.

FIG. 1A shows an example of a foldable electronic device including an antenna according to this application. As shown in FIG. 1A, a foldable electronic device may include a first body 11, a second body 12, and a rotating shaft 13 connected to the first body 11 and the second body 12.

The first body 11 and the second body 12 are rotatable around the rotating shaft 13. As the first body 11 and the second body 12 rotate, a form of the foldable electronic device may be switched between a folded state and an unfolded state. There may be one or more rotating shafts 13. In FIG. 1A, two rotating shafts 13 are used as an example.

The first body 11 may include a housing 14. The second body 12 may include a housing 16. The housing 14 and the housing 16 may respectively protect internal components of the first body 11 and the second body 12. A material of the housing may be a metal material, for example, aluminum-magnesium alloy.

The housing 14 and the housing 16 may be two independent housings or two parts of one entire housing. When the housing 14 and the housing 16 are two parts of one entire housing, the entire housing may be a housing that is bendable at a position of the rotating shaft 13, for example, a flexible housing.

The first body 11 may further include an input/output panel 15 disposed opposite to the housing 14. The second body 12 may further include an input/output panel 17 disposed opposite to the housing 16. In an implementation, when one of the input/output panel 15 and the input/output panel 17 is an input panel (for example, a keyboard panel), the other is an output panel (for example, a display panel). In another implementation, the input/output panel 15 and the input/output panel 17 may simultaneously be input panels and output panels, where the input panel may be, for example, a touch panel, and the output panel may be, for example, a display panel. For example, the input/output panel 15 and the input/output panel 17 may be touch screens that simultaneously are touch panels and display panels. In this case, the input/output panel 15 and the input/output panel 17 may be two parts of one entire flexible touch screen.

For ease of describing the folded state, unfolded state, and dynamic switching between the folded state and the unfolded state of the foldable electronic device, as shown in FIG. 1A, the foldable electronic device may be divided into four surfaces: a surface A, a surface B, a surface C, and a surface D. The surface A is a surface on which the housing 14 of the first body 11 is located, the surface B is a surface on which the input/output panel 15 of the first body 11 is located, the surface C is a surface on which the input/output panel 17 of the second body 12 is located, and the surface D is a surface on which the housing 16 of the second body 12 is located.

Figure 1B:
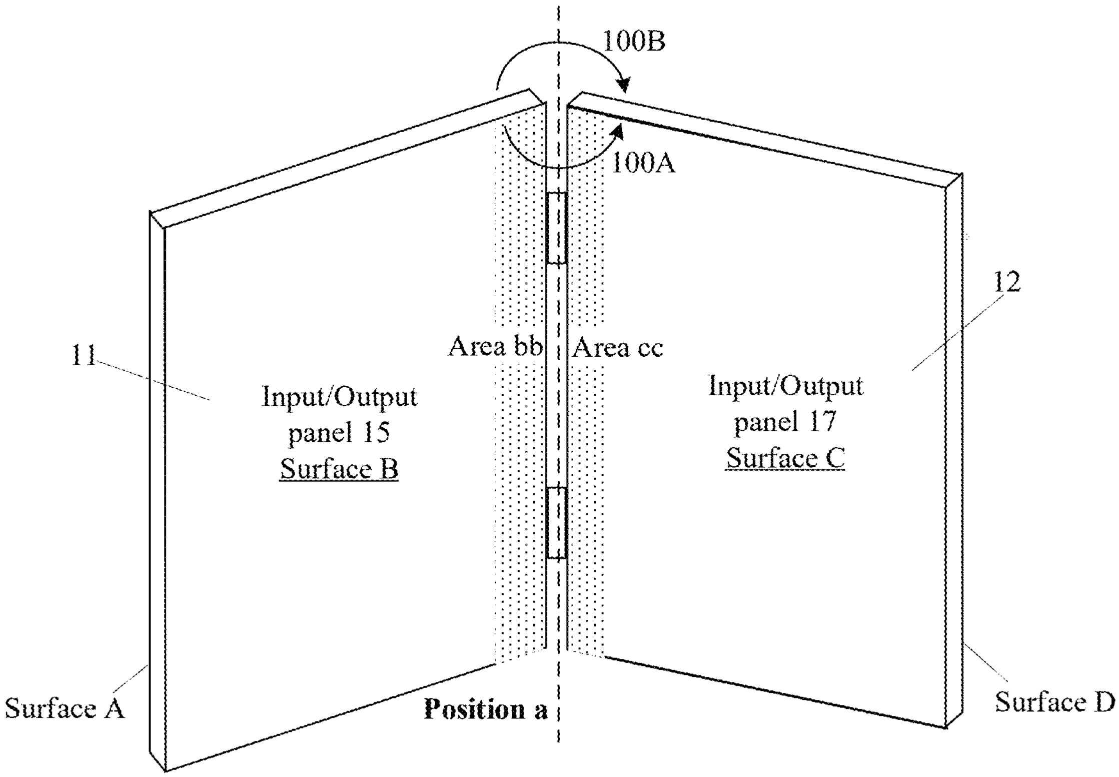
FIG. 1B shows two folding directions of the electronic device including an antenna shown in FIG. 1A.

The first body 11 and the second body 12 are folded inward, so that the foldable electronic device may be in a completely or nearly completely folded state. In this case, the surface A and the surface D are exposed, and the surface B and the surface C may be in partial or complete contact. Herein, inward folding may be shown in FIG. 1B, in which the first body 11 and the second body 12 are folded along a first direction 100A.

Alternatively, the first body 11 and the second body 12 are folded outward, so that the foldable electronic device may be in another completely or nearly completely folded state. In this case, the surface B and the surface C are exposed, and the surface A and the surface D may be in partial or complete contact. Herein, outward folding may be shown in FIG. 1B, in which the first body 11 and the second body 12 are folded along a second direction 100B.

Alternatively, the first body 11 and the second body 12 are folded outward or inward, so that the foldable electronic device may be in the unfolded state. The unfolded state may be a state in which an included angle between the surface B and the surface C of the foldable electronic device is greater than a specific angle, where the specific angle may be, for example, 30°, 45°, 60°, or 90°. In this case, the input/output panels of the surface B and the surface C can be fully exposed to a user, so that a condition for implementing human-machine interaction is fulfilled. The unfolded state may include a plurality of unfolded positions, and the unfolded position may be defined based on the included angle between the surface B and the surface C, for example, 90°, 110°, 120°, 150°, 180°, 210°, or 300°. When the included angle between the surface B and the surface C is equal to or close to 180°, the foldable electronic device is in the completely or nearly completely unfolded state.

A folding position a of the foldable electronic device is not covered by input/output panels, such as a display, having a signal shielding feature, so that an area bb that is on the housing 14 and that is adjacent to the folding position or an area cc that is on the housing 16 and that is adjacent to the folding position is not opposite to the display. This is closely related to an antenna layout, and details are described in the following embodiments. The folding position may be a position through which an axis of the rotating shaft passes, and may be externally represented as a position of a crease or seam. That the area bb or cc is adjacent to the folding position may mean that a gap between a point that is in the area bb or cc and that is farthest from the folding position and the folding position does not exceed a specific distance value, for example, 25 mm, 30 mm, or the like.

Figure 2A:
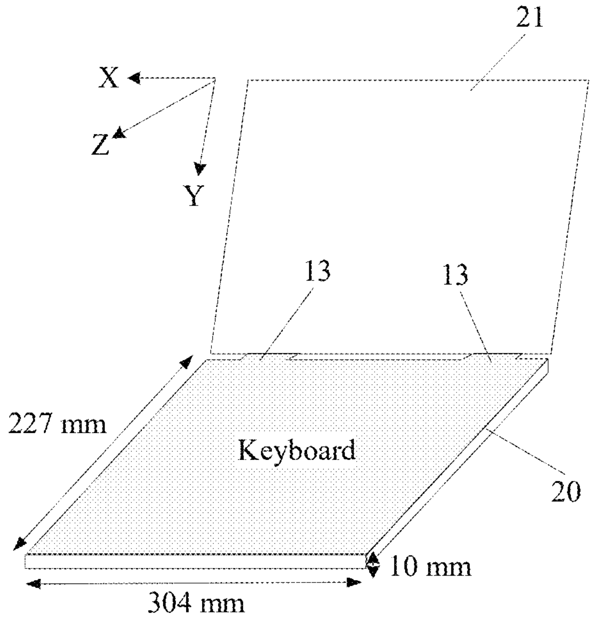
FIG. 2A and FIG. 2B show a notebook computer according to an embodiment of this application.
Figure 2B:
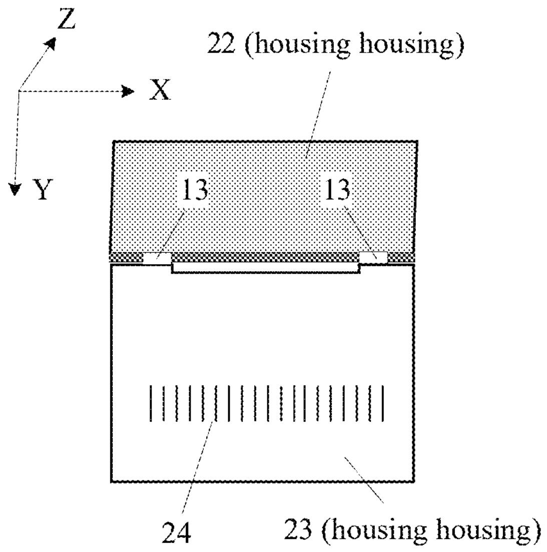
Figure 2C:
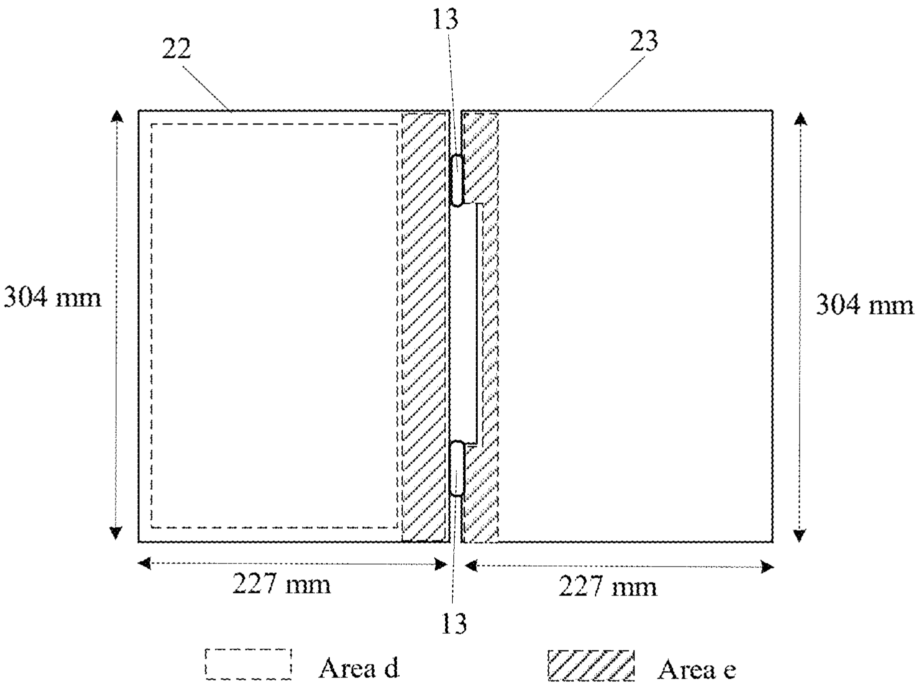
FIG. 2C shows several areas on a housing.

For example, as shown in FIG. 2A and FIG. 2B, the foldable electronic device may be a notebook computer, and a folding position of the notebook computer is not covered by a display. In this case, the first body 11 may be a host body 20, and the second body 12 may be a screen 21. The housing 14 may be a housing 23 of the host body 20, and the housing 16 may be a housing 22 of the screen 21. In addition to the housing 23, the host body 20 may further be configured with components such as a computer mainboard, a processor, a hard disk, a memory, a universal serial bus (universal serial bus, USB) interface, and an input panel, for example, a keyboard. The keyboard is not limited to physical buttons in a conventional sense, but may further be extended to input components such as a touch panel. In addition to the housing 22, the screen 21 may further be configured with components such as a display, a backlight plate, and an integrated circuit (integrated circuit, IC). A surface on which the housing 22 of the screen 21 is located is the surface A, a surface on which the display of the screen 21 is located is the surface B, a surface on which the keyboard of the host body 20 is located is the surface C, and a surface on which the housing 23 of the host body 20 is located is the surface D. An air inlet grid 24 may be disposed on the surface D, and a serial number (serial number, SN) label that identifies a machine identity may further be stuck on the surface D. FIG. 2C shows an example of a housing area of the notebook computer. An area d is an area that is opposite to the display and that is on the housing, and an area e is an area adjacent to the folding position. The area e and the area d do not overlap. As large screen design becomes popular, the area d occupies a large proportion of the housing.

In addition to the foregoing housing 14, housing 16, rotating shaft 13, and the like, the foldable electronic device may further be configured with an antenna, to implement one or more of the foregoing communication technologies.

Conventionally, the antenna may be designed to be inside the electronic device. However, a thickness of the entire foldable electronic device is usually small, and as a result, internal space for antenna design is limited. For a foldable electronic device with a full metal ID, the metal housing 14 and the metal housing 16 of the foldable electronic device form two large ground plates and shield an antenna signal. The full metal ID may mean that the housing 14, the housing 16, and the rotating shaft 13 of the foldable electronic device are all made of metal.

Figure 3A:
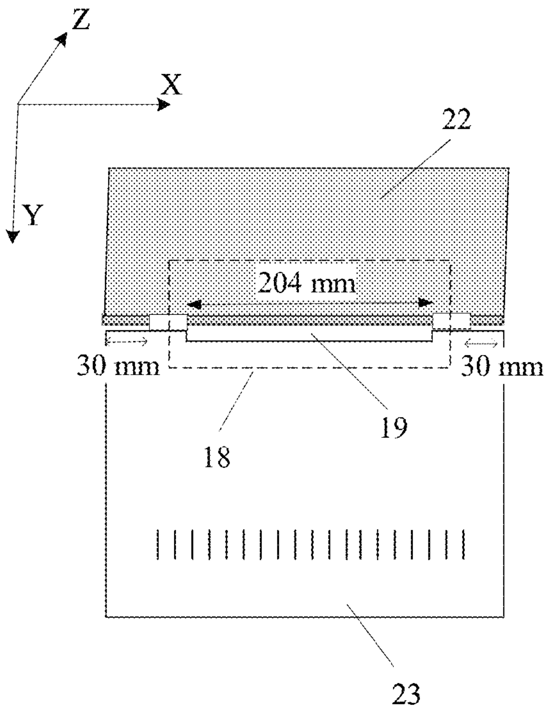
FIG. 3A and FIG. 3B show an antenna design solution for a notebook computer with a full metal ID.
Figure 3B:
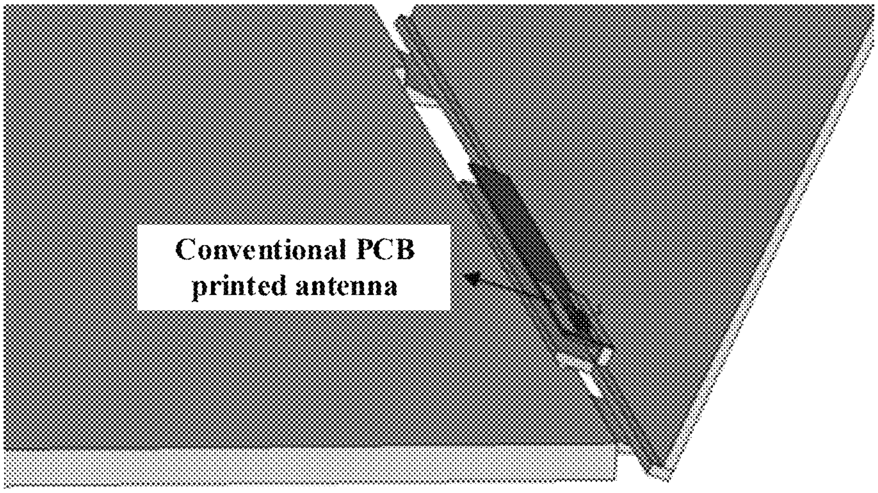
Figure 3C:
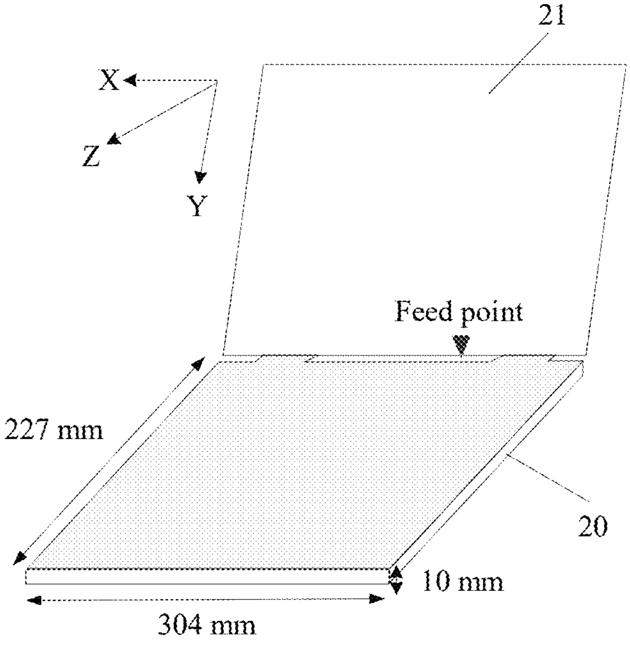
FIG. 3C shows a feed position of the antenna design solution shown in FIG. 3A and FIG. 3B.
Figure 3D:
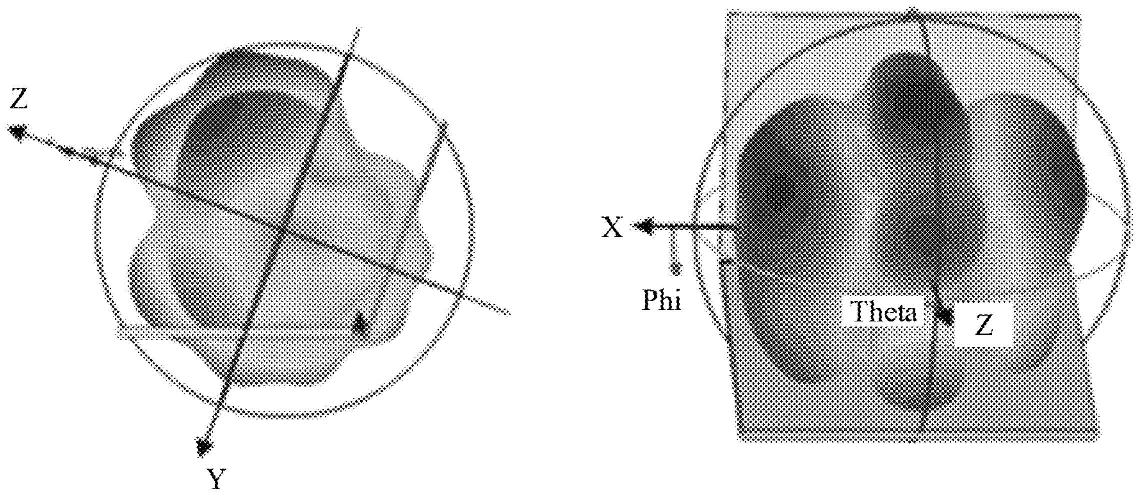
FIG. 3D shows antenna pattern simulation of the antenna design solution shown in FIG. 3A and FIG. 3B.

In view of these problems, as shown in FIG. 3A and FIG. 3B, an antenna, for example, a flexible printed circuit (flexible printed circuit, FPC) antenna or a laser direct structuring (laser direct structuring, LDS) antenna, may be disposed in an area 18 between two metal rotating shafts 13. In the area 18, the two metal rotating shafts 13 connect the housing 14 and the housing 16 to form a closed slot (slot) 19 whose two ends are grounded, so that the antenna may radiate outward through the slot 19. FIG. 3C shows a feed point of the antenna disposed in the area 18. The feed point may be connected to a radio frequency module on a main body side by using a coaxial cable to implement feeding. However, directivity of the antenna disposed in the area 18 is poor. As shown in FIG. 3D, when the antenna operates in a frequency band of 2.4 G, a directivity coefficient of the antenna is up to 8 to 8.5 dBi. This is not conducive to omnidirectional coverage of a signal. Main reasons for the poor directivity are as follows: First, when the foldable electronic device, for example, the notebook computer, is in the unfolded state, and in particular, when the included angle between the screen and the host body is approximately 110°, as shown in FIG. 3D, energy of the antenna is mainly centralized in front of the screen (the surface B side), and an antenna gain in front of the screen is high. This causes a signal in another area to be weak, for example, a signal behind the screen (the surface A side) is weak. Second, relatively large sizes of the two ground plates, namely the housing 14 and the housing 16, result in more cycles of a ground plate current excited by the antenna and more zero points in the pattern. Third, the antenna further excites the slot 19 to generate radiation, and a directivity of a high-order mode excited by the slot 19 is very high.

To resolve the foregoing antenna design problem, embodiments of this application provide antenna design solutions applied to the foregoing foldable electronic device.

Figure 4A:
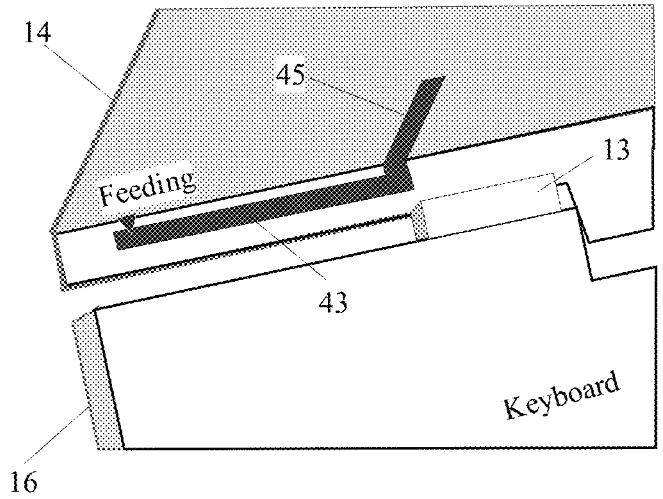
FIG. 4A and FIG. 4B show a slot antenna included in a foldable electronic device according to an embodiment of this application.
Figure 4B:
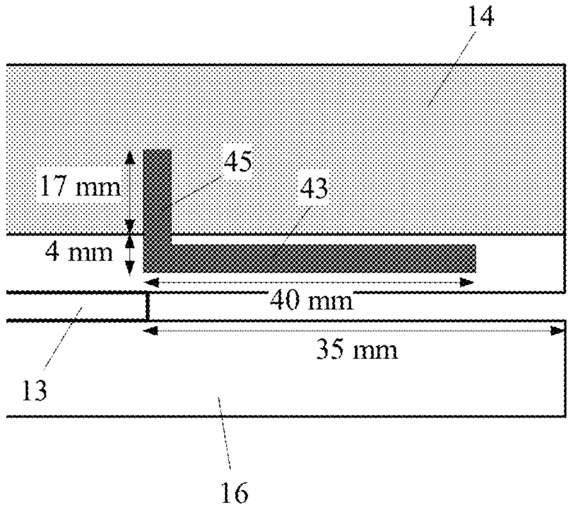

As shown in FIG. 4A and FIG. 4B, a slot antenna may be formed by hollowing out the metal housing 14 or the metal housing 16. The slot antenna may include a first branch 43 and a second branch 45, where the first branch 43 and the second branch 45 may be perpendicular to each other, and an antenna form may be equivalent to a shape formed by bending a strip slot antenna whose two ends are grounded. The feed point of the antenna is disposed on one of the branches, and may be connected to the radio frequency module by using the coaxial cable to feed the antenna. In this way, because the first branch 43 and the second branch 45 are perpendicular to each other, a horizontal current and a vertical current on the housing ground plate may be excited, and the horizontal current and the vertical current jointly generate radiation. This can effectively reduce an antenna directivity coefficient, improve an antenna radiation pattern, and improve a signal coverage capability of the electronic device.

Figure 4C:
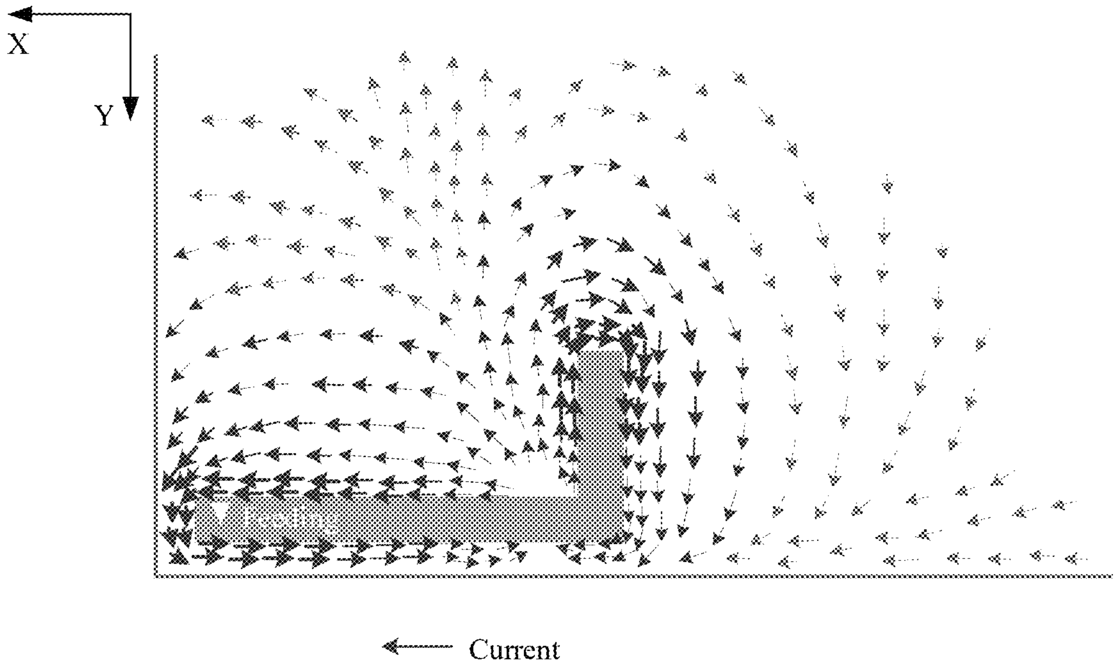
FIG. 4C shows a current that is of a housing ground plate and that is excited by a slot antenna.

Distribution of currents that are of the ground plate and that are excited by the slot antenna may be shown in FIG. 4C.

"Horizontal" and "vertical" herein are defined by using the foldable electronic device rather than a terrestrial coordinate system for reference. "Horizontal" may mean an extension direction of the axis of the rotating shaft, and the extension direction is the same as an extension direction of a housing side edge connected to the rotating shaft, and "vertical" means a direction perpendicular to the horizontal direction. A part that is of the metal housing and that is hollowed out to form the slot antenna may be filled with a non-metal medium with a metallic appearance, to implement appearance unification.

Sizes shown in FIG. 4A and FIG. 4B are merely examples. In actual application, the sizes may be determined based on design requirements such as a structure, an appearance, and a circuit. This is not limited in embodiments of this application.

Further, an antenna layout and an antenna branch size of the slot antenna may be considered as follows.

Antenna Layout

Figure 5A:
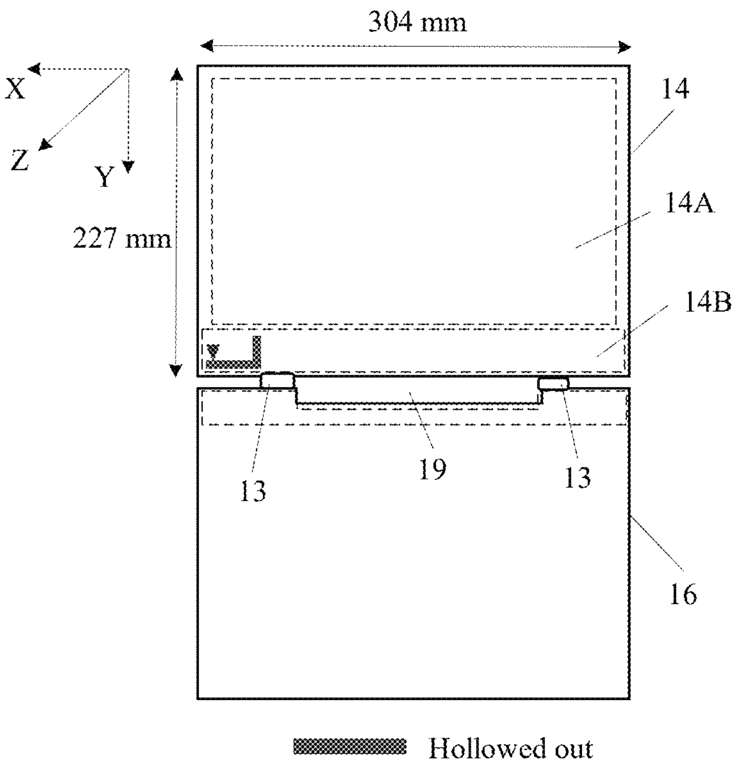
FIG. 5A shows an antenna layout of a slot antenna according to an embodiment of this application.

As shown in FIG. 5A, the slot antenna may be distributed in an area 14B that is on the housing (for example, the housing 14) and that is adjacent to the folding position. Because the area is not opposite to the display, an antenna radiation signal of the slot antenna distributed in the area is not shielded by the display. In FIG. 5A, an area 14A is an area that is on the housing and that is opposite to the display, and signal radiation of an antenna provided in the area is shielded by the display.

For a foldable electronic device having two or more metal rotating shafts, when the housing ground plate is hollowed out to form the slot antenna, as shown in FIG. 5A, the slot antenna may avoid the slot 19 and further be provided on an outer side of the rotating shaft, to avoid a problem that the long slot 19 formed by connecting the rotating shaft to the metal housing is excited to generate the high-order mode with the high directivity coefficient.

Figure 5B:
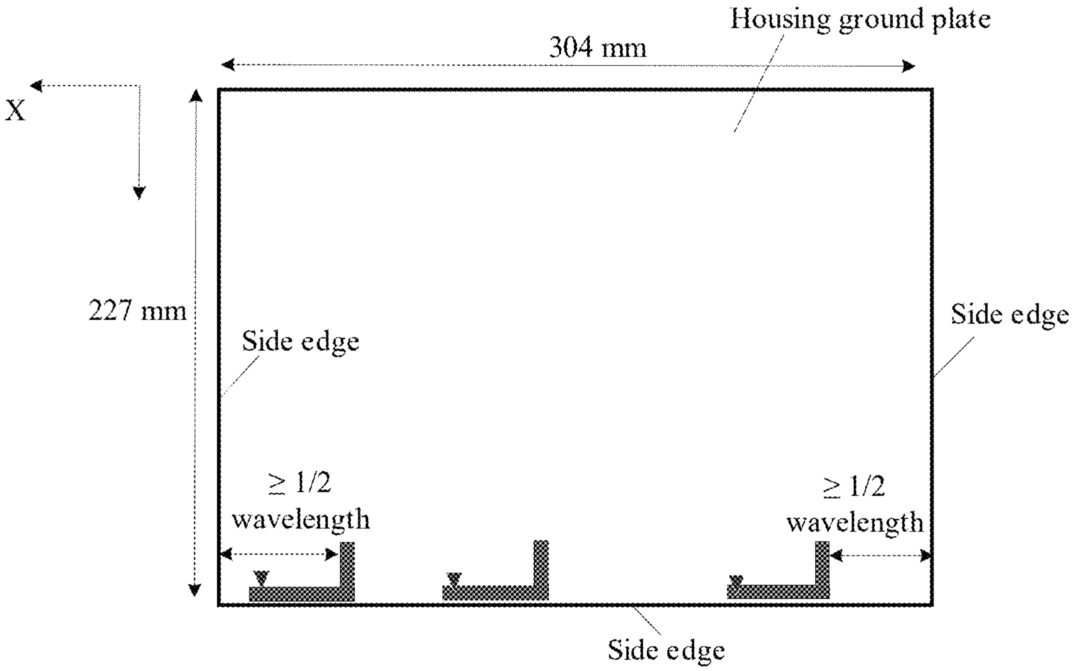
FIG. 5B shows several antenna layouts on the housing ground plate.
Figure 5C:
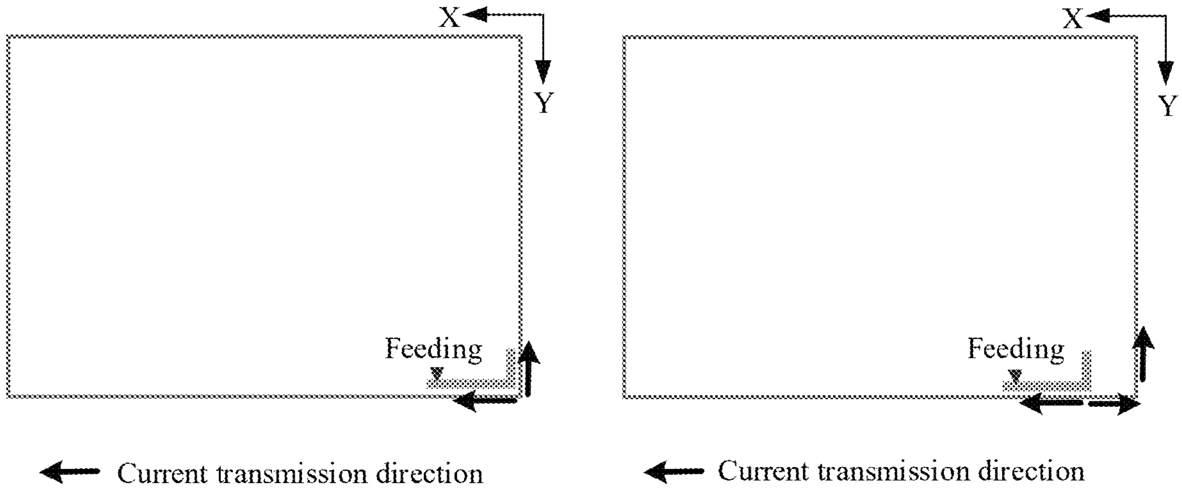
FIG. 5C shows transmission directions of a ground plate current excited when two branches are distributed along a side edge of the ground plate and a ground plate current excited when the two branches are not distributed along the side edge of the ground plate at the same time.

In addition, when both the two branches are distributed along the side edge of the housing ground plate, distribution of excited currents of the ground plate is shown in FIG. 5B, where the first branch 43 that is distributed along a horizontal side edge excites a vertical current of the ground plate, and the second branch 45 that is distributed along a vertical side edge excites a horizontal current of the ground plate. However, because the second branch 45 is distributed along the side edge, a horizontal current excited by the second branch 45 is centrally distributed on the ground plate on one side of the branch. Consequently, a horizontal current on the other side of the second branch 45 is quite low as a result of extremely small ground plate space. In this case, antenna radiation is unbalanced in the horizontal direction, and the directivity coefficient of the slot antenna is significantly increased. In view of this, only one of the two branches is selected to be distributed along the side edge of the housing ground plate and the other needs to be far away from the side edge of the housing ground plate. For example, as shown in FIG. 5C, the first branch 43 is distributed along the side edge of the housing ground plate, and the second branch 45 is distributed far away from the side edge of the housing ground plate. In other words, the two branches of the slot antenna are not distributed along the side edge of the housing ground plate at the same time. In this case, distribution of currents that are of the ground plate and that are excited by the slot antenna is shown in FIG. 5C. Because the second branch 45 is no longer distributed along the side edge, the horizontal current excited by the second branch 45 is distributed on the ground plate on both sides of the branch in a balanced manner. In this case, antenna radiation is more balanced in the horizontal direction, and an antenna directivity coefficient is low. Herein, that the branch is distributed along the side edge of the housing ground plate may mean that the branch is adjacent to the side edge, or may further limit the branch to be parallel to the side edge. "Adjacent" may mean that a distance from the branch to the side edge does not exceed a specific distance value, for example, 10 mm. "Far away" may mean that the distance from the branch to the side edge is not less than a specific distance value, for example, ½ operating wavelength.

Antenna Branch Size

Sizes of the first branch 43 and the second branch 45 determine a ratio of the excited horizontal current of the housing ground plate to the excited vertical current of the housing ground plate. In other words, the sizes of the first branch 43 and the second branch 45 determine whether the horizontal current and the vertical current of the housing ground plate can be excited in a balanced manner, so that balance of antenna pattern coverage is affected.

It is assumed that a specification of the housing ground plate is 304 mm*227 mm. In other words, a length that is of the housing ground plate and that is in the horizontal direction is greater than a length that is of the housing ground plate and that is in the vertical direction.

Figure 6A:
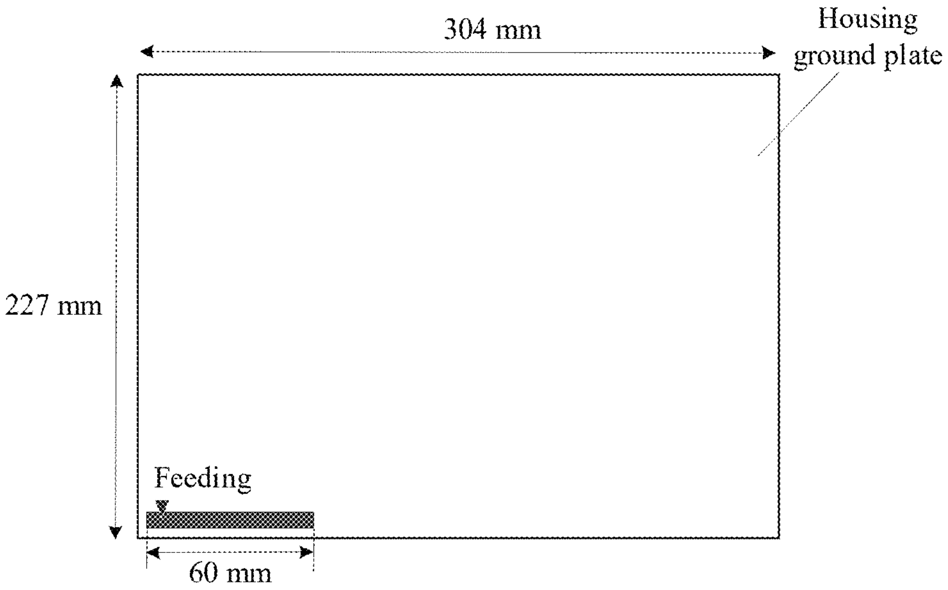
FIG. 6A shows a slot antenna of an antenna branch size.
Figure 6B:
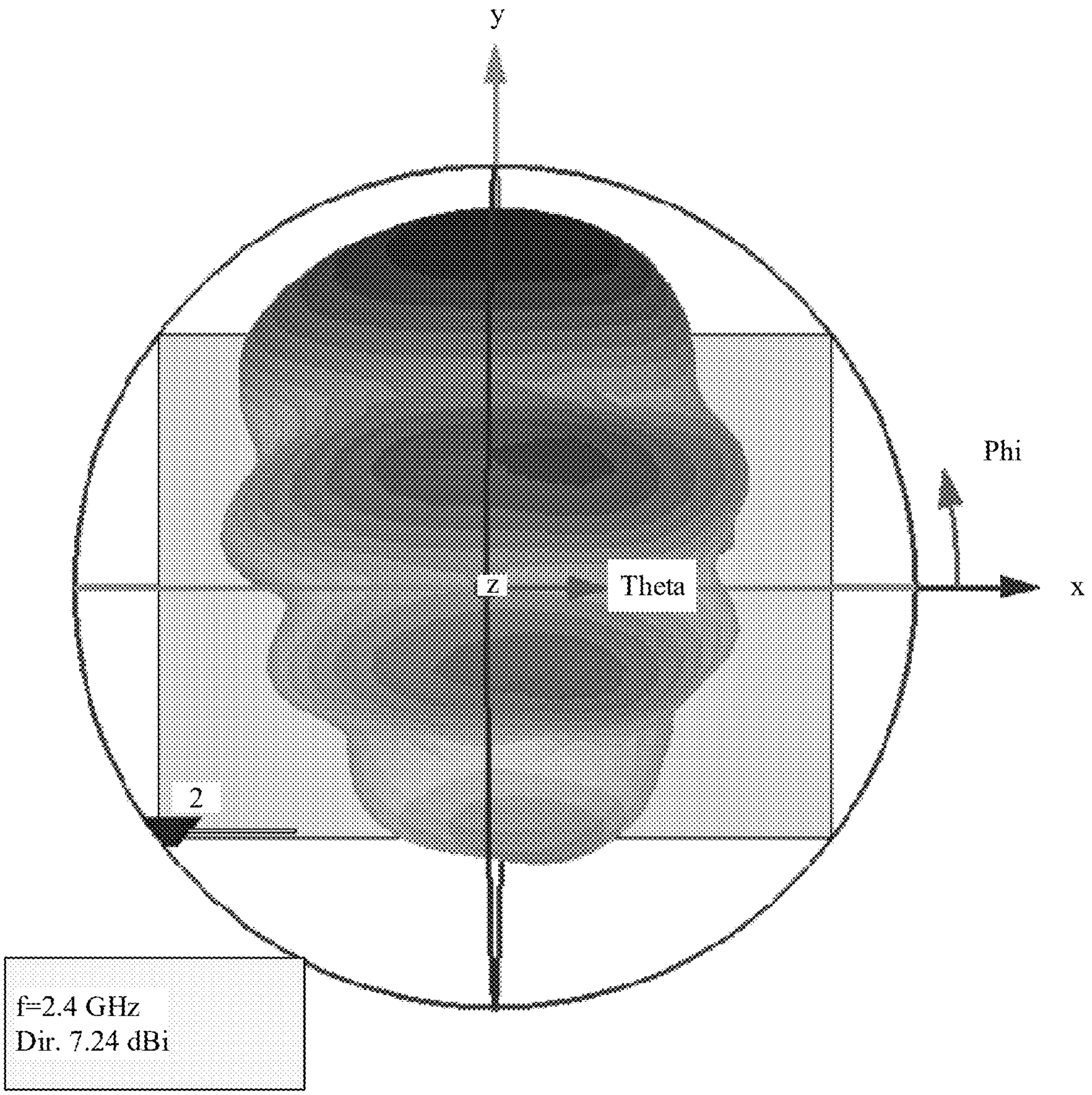
FIG. 6B shows radiation pattern simulation of the slot antenna in FIG. 6A at 2.4 GHz.

First, for comparison, FIG. 6A shows a strip slot antenna that is closed at two ends and that is relatively long (60 mm), that is, an unbent strip slot antenna. FIG. 6B shows pattern simulation of the strip slot antenna at an operating frequency of 2.4 GHz.

It can be seen that, an antenna directivity coefficient of the slot antenna is approximately 7.2 dBi, antenna radiation is obviously centralized in a positive direction of a Y-axis, and the quite high directivity coefficient of the antenna is not conducive to omni-directional coverage of the signal.

Figure 6C:
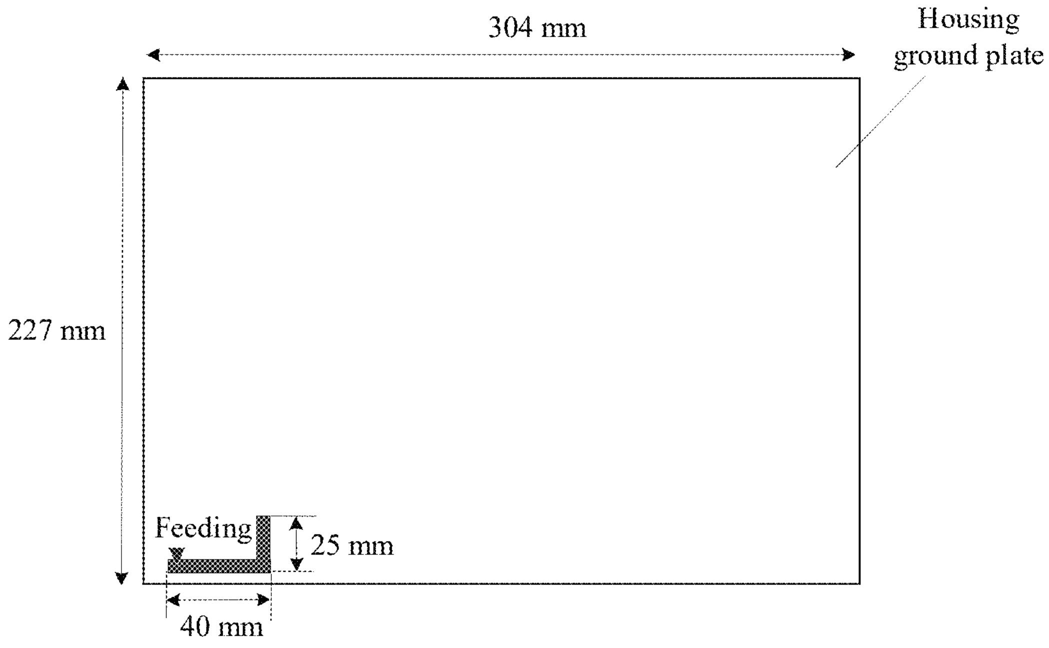
FIG. 6C shows a slot antenna of another antenna branch size.
Figure 6D:
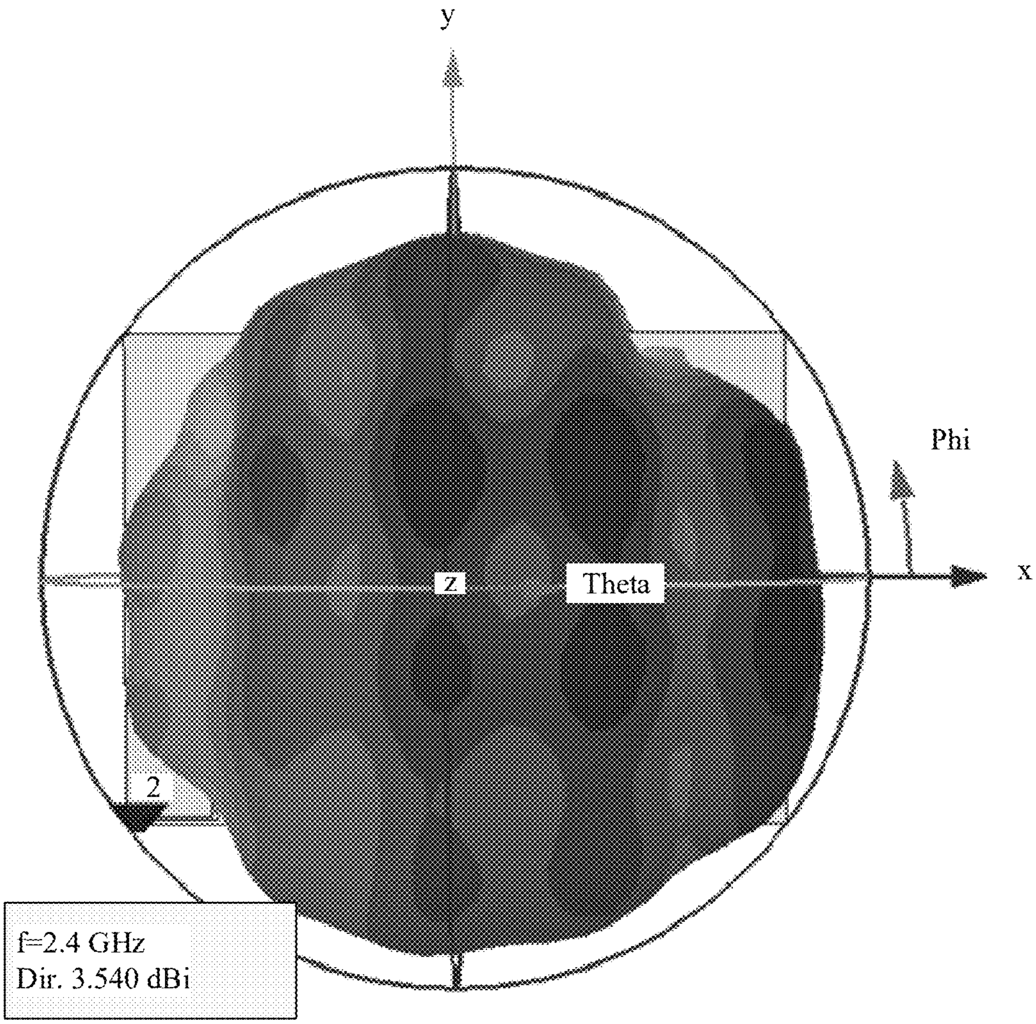
FIG. 6D shows radiation pattern simulation of the slot antenna in FIG. 6C at 2.4 GHz.
Figure 6E:
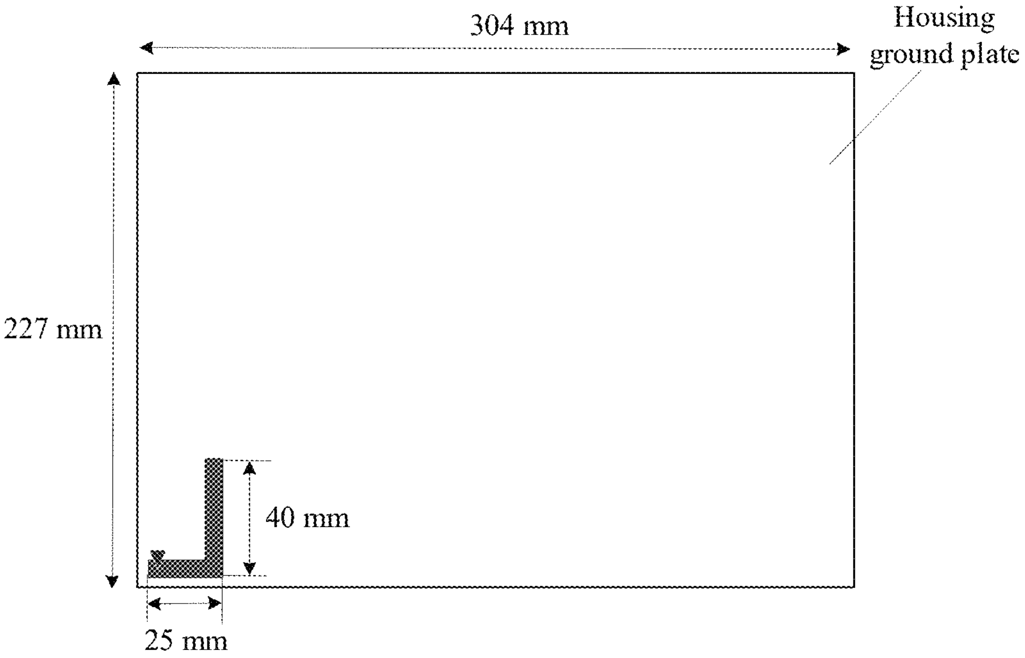
FIG. 6E shows a slot antenna of still another antenna branch size.
Figure 6F:
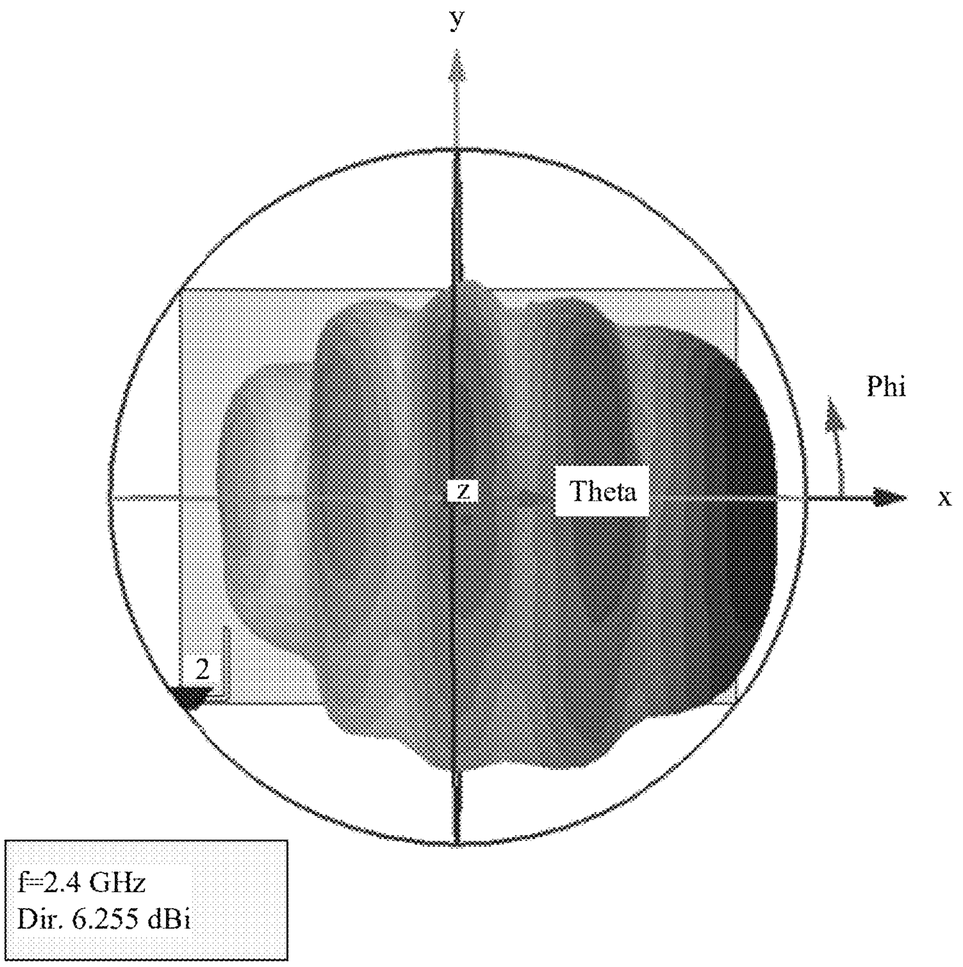
FIG. 6F shows radiation pattern simulation of the slot antenna in FIG. 6E at 2.4 GHz.

In addition, FIG. 6C to FIG. 6E show examples of two antenna sizes of a bent L-shaped slot antenna. FIG. 6D to FIG. 6F show pattern simulation of the slot antennas of the two antenna sizes at an operating frequency of 2.4 GHz. As shown in FIG. 6C and FIG. 6D, when the first branch 43 is 15 mm longer than the second branch 45, an antenna directivity coefficient is approximately 3.5 dBi, and antenna radiation in the directions is balanced. As shown in FIG. 6E and FIG. 6F, when the first branch 43 is 15 mm shorter than the second branch 45, an antenna directivity coefficient is significantly increased, and is approximately 6.2 dBi, and antenna radiation in the directions is no longer unbalanced but concentrated in a positive direction of an X-axis.

In other words, when the antenna branch distributed along the longer side edge is longer, balancing between the horizontal current and the vertical current of the ground plate is facilitated. Further, a length difference between the two antenna branches should not be significant. The length difference may adapt to a difference between the length that is of the housing ground plate and that is in the horizontal direction and the length that is of the housing ground plate and that is in the vertical direction. In this way, the antenna directivity coefficient can further be reduced, and an omni-directional coverage capability of a signal can be improved. The slot antenna shown in FIG. 6A may be considered as an L-shaped slot antenna with the second branch 45 whose length is zero.

"Adapt" means that if the difference between the length that is of the housing ground plate and that is in the horizontal direction and the length that is of the housing ground plate and that is in the vertical direction increases, the length difference between the two antenna branches may correspondingly increase, or if the difference between the length that is of the housing ground plate and that is in the horizontal direction and the length that is of the housing ground plate and that is in the vertical direction decreases, the length difference between the two antenna branches may correspondingly decrease. For example, if a ratio of the longer side edge of the ground plate to the shorter side edge of the ground plate is 304/227, a ratio of a length of the antenna branch distributed along the longer side edge to a length of the other antenna branch is close to the ratio 304/227. Herein, "close to" may mean that a difference between the length ratio and the ratio 304/227 does not exceed a specific value, for example, 20%. In this case, the horizontal current and the vertical current that are of the housing ground plate and that are excited by the slot antenna are more balanced, which helps reduce the antenna directivity coefficient. Certainly, 20% is merely an example. In actual application, selection of the difference may be guided by a result that the antenna directivity coefficient is relatively low. Provided that implementing the "adapt" helps further reduce the antenna directivity coefficient, the length difference between the two antenna branches falls within coverage of embodiments of this application.

The following describes embodiments of this application in detail with reference to the accompanying drawings. In the following embodiments, antenna simulation is based on the following environment: A length*width of the metal housing 14 is 304 mm*227 mm, a length*width of the metal housing 16 is 304 mm*227 mm, and a thickness of the entire device is 10 mm.

Embodiment 1

Figure 7:
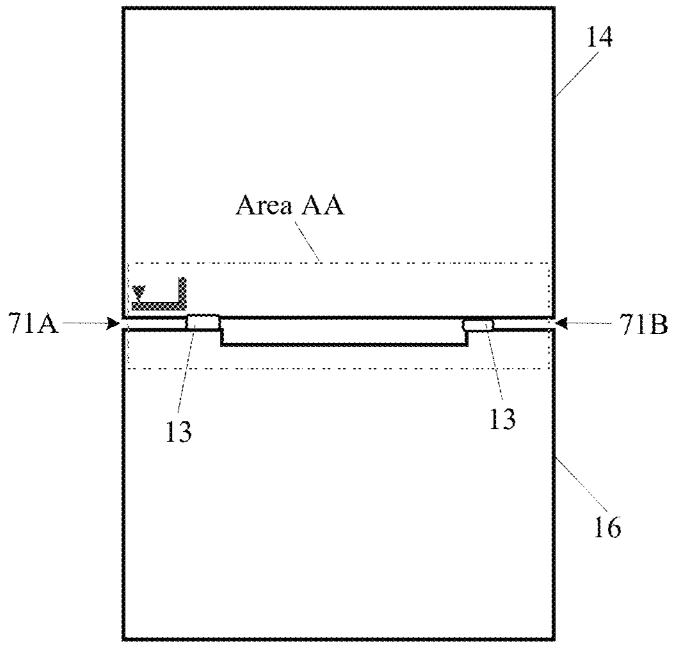
FIG. 7 shows an electronic device including an antenna according to an embodiment of this application.

As shown in FIG. 7, the housing 14 and the housing 16 of the foldable electronic device may be two independent metal housings. The housing 14 and the housing 16 may be connected by using the metal rotating shaft 13. On the outer side of the metal rotating shaft 13, the rotating shaft 13 is connected to the housing 14 and the housing 16 to form a slot 71A and a slot 71B that are closed at one end and open at the other end. In addition, as shown in FIG. 7, when the foldable electronic device is in the unfolded state, the slot 71A and the slot 71B still exist. In this case, the housing 14 and the housing 16 are not in contact with each other on the outer side of the rotating shaft 13.

In the foldable electronic device, the L-shaped slot antenna may be formed by hollowing out a housing ground plate, and includes the first branch 43 and the second branch 45. The housing ground plate may be the housing 14 or the housing 16. In FIG. 7, an example in which the housing ground plate is the housing 14 is used. The L-shaped slot antenna may be distributed in an area AA that is on the housing ground plate and that is adjacent to the folding position. Specifically, as shown in FIG. 7, the first branch 43 may be selected to be distributed along the folding position. That the antenna branch is distributed along the folding position may include: The antenna branch is distributed along the housing side edge connected to the rotating shaft. The housing side edge connected to the rotating shaft is a position that is on the housing ground plate and that is nearest to the folding position. When the first branch 43 is selected to be distributed along the housing side edge connected to the rotating shaft, the second branch 45 may be far away from the side edge of the housing, so that the horizontal current and the vertical current of the housing ground plate are excited in a balanced manner.

Refer to the content of the foregoing antenna branch size. Because a length that is of the housing ground plate and that is in the horizontal direction is greater than a length that is of the housing ground plate and that is in the vertical direction, the first branch 43 arranged along the horizontal direction may be longer than the second branch 45 arranged along the vertical direction, so that the horizontal current and the vertical current of the housing ground plate are excited in a balanced manner. A difference between the first branch 43 and the second branch 45 can adapt to a difference between the length that is of the housing ground plate and that is in the horizontal direction and the length that is of the housing ground plate and that is in the vertical direction. Certainly, in this embodiment, it is not excluded that the housing ground plate presents another specification in which the length in the vertical direction is greater than the length in the horizontal direction. In this case, the second branch 45 arranged along the vertical direction is larger than the first branch 43 arranged along the horizontal direction, so that the horizontal current and the vertical current of the ground plate can be excited in a more balanced manner.

In Embodiment 1, the slot antenna distributed adjacent to the folding position is not located in the area that is on the housing ground plate and that is opposite to the display, so that the antenna radiation signal of the slot antenna is not shielded by the display. The horizontal current that is of the housing ground plate and that is excited by the antenna branch distributed along the folding position and the vertical current that is of the housing ground plate and that is excited by the other antenna branch jointly generate radiation. This can effectively reduce the antenna directivity coefficient. In addition, in this case, the slot antenna is distributed approximately in the middle of the foldable device, and the antenna branch that is of the slot antenna and that is distributed along the folding position can simultaneously excite horizontal currents of the housing ground plates on both sides of the folding position, so that coverage of patterns in front of the display and behind the display is more balanced.

Embodiment 2

Figure 8:
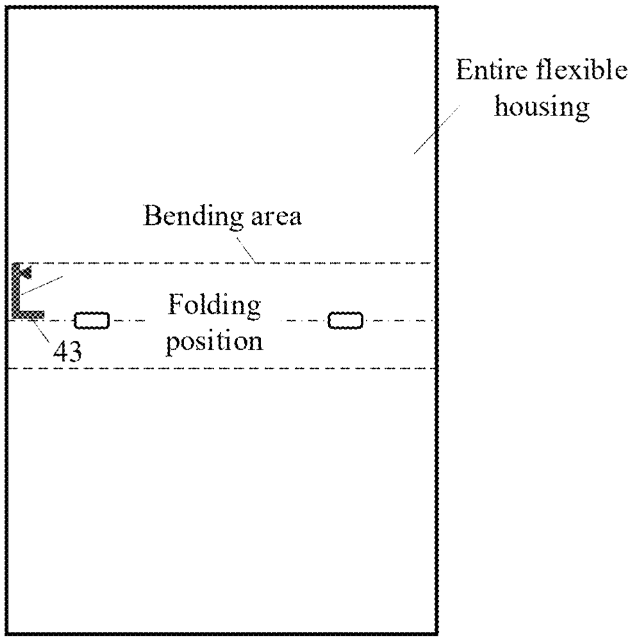
FIG. 8 shows another electronic device including an antenna according to an embodiment of this application.

As shown in FIG. 8, the housing 14 and the housing 16 of the foldable electronic device may be two parts of one entire metal housing, and the entire metal housing is rotatable around the rotating shaft 13 and bendable at a folding position. In this case, on the outer side of the rotating shaft 13, the housing 14 and the housing 16 are naturally short-circuited because they are integrated, and there is no open slot 71A and no open slot 71B shown in FIG. 7 between the housing 14 and the housing 16.

In the foldable electronic device, the L-shaped slot antenna may be formed by hollowing out the housing ground plate, and includes the first branch 43 and the second branch 45. The housing ground plate is the entire metal housing.

The L-shaped slot antenna may be distributed in a bending area of the entire metal housing. Specifically, the first branch 43 or the second branch 45 may be selected to be distributed along the folding position. When one of the two antenna branches is provided along the folding position, the other antenna branch may be provided along the side edge of the housing ground plate, or the other antenna branch may be provided far away from the side edge of the housing ground plate.

Refer to the content of the foregoing antenna branch size. Because a length that is of the entire metal housing and that is in the vertical direction is obviously greater than a length that is of the entire metal housing and that is in the horizontal direction, the first branch 43 arranged along the vertical direction may be longer than the second branch 45 arranged along the horizontal direction, so that the horizontal current and the vertical current of the housing ground plate are excited in a balanced manner. A difference between the first branch 43 and the second branch 45 can adapt to a difference between the length that is of the housing ground plate and that is in the vertical direction and the length that is of the housing ground plate and that is in the horizontal direction. Certainly, in this embodiment, it is not excluded that the entire metal housing presents another specification in which the length in the vertical direction is less than the length in the horizontal direction. In this case, the first branch 43 arranged along the horizontal direction is larger than the second branch 45 arranged along the vertical direction, so that the horizontal current and the vertical current of the ground plate can be excited in a more balanced manner.

In Embodiment 2, the slot antenna distributed in the bending area is naturally adjacent to the folding position of the foldable electronic device, and is not located in the area that is on the housing ground plate and that is opposite to the display, so that an antenna radiation signal of the slot antenna is not shielded by the display. The horizontal current that is of the housing ground plate and that is excited by the antenna branch distributed along the folding position and the vertical current that is of the housing ground plate and that is excited by the other antenna branch jointly generate radiation. This can effectively reduce the antenna directivity coefficient. In addition, in this case, the slot antenna is distributed approximately in the middle of the foldable device, and the antenna branch that is of the slot antenna and that is distributed along the folding position can simultaneously excite horizontal currents of the housing ground plates on both sides of the folding position, so that coverage of patterns in front of the display and behind the display is more balanced.

Embodiment 3

Figure 9:
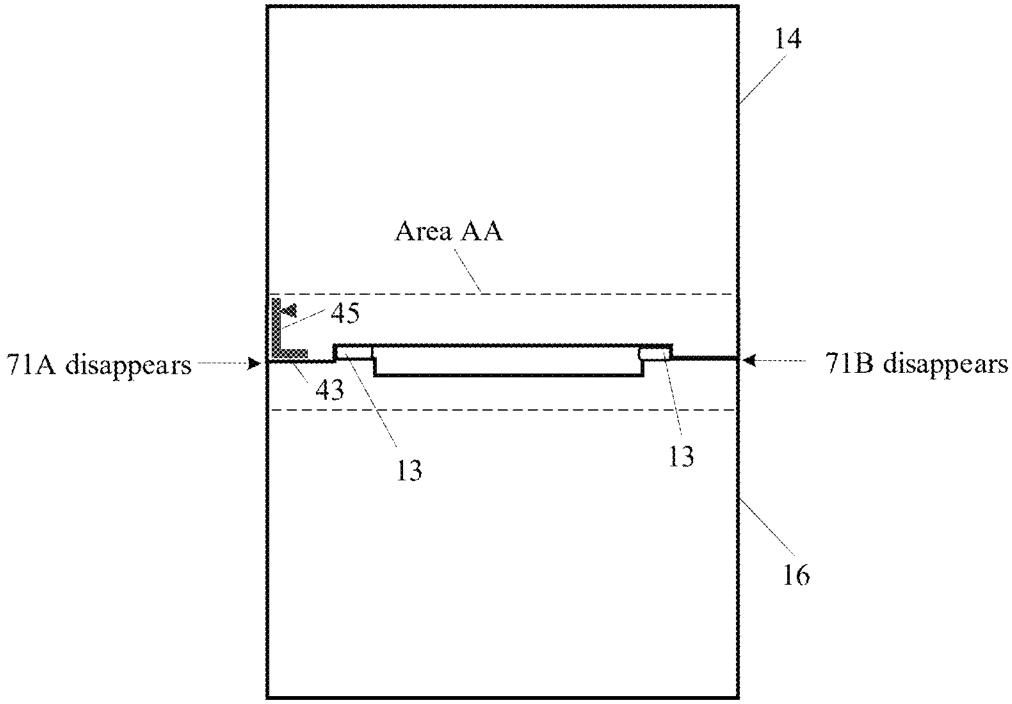
FIG. 9 shows still another electronic device including an antenna according to an embodiment of this application.

The housing 14 and the housing 16 of the foldable electronic device may be two independent metal housings, and the housing 14 and the housing 16 are connected by using the rotating shaft 13. As shown in FIG. 9, when the foldable electronic device is in an unfolded state, a slot 71A and a slot 71B disappear, and the housing 14 and the housing 16 can be in contact with each other and form a short circuit on the outer side of the rotating shaft. In this case, the housing 14 and the housing 16 are equivalent to an integrated ground plate formed on the outer side of the rotating shaft 13.

In the foldable electronic device, the L-shaped slot antenna may be formed by hollowing out the housing 14 or the housing 16, and includes the first branch 43 and the second branch 45. When the foldable electronic device is in the unfolded state, the housing ground plate may be the integrated ground plate formed by combining the housing 14 and the housing 16 on the outer side of the rotating shaft 13.

The L-shaped slot antenna may be distributed in an area AA that is on the housing ground plate and that is adjacent to the folding position. Specifically, as shown in FIG. 9, the first branch 43 may be selected to be distributed along the folding position. That the antenna branch is distributed along the folding position may include: The antenna branch is distributed along the housing side edge connected to the rotating shaft. Embodiment 3 is different from Embodiment 1 in that when the first branch 43 is selected to be distributed along the housing side edge connected to the rotating shaft, as shown in FIG. 9, the second branch 45 may also be distributed along the side edge of the housing and not far away from the side edge of the housing. Because, when the foldable electronic device is in the unfolded state, the housing 14 and the housing 16 can be in contact with each other and form a short circuit on the outer side of the rotating shaft, and therefore an antenna boundary condition changes. It is equivalent to that, in this case, the first branch 43 is no longer distributed along the side edge of the housing ground plate, only the second branch 45 is distributed along the side edge of the housing ground plate, antenna radiation is balanced, and an antenna directivity coefficient is relatively low.

When the foldable electronic device is in the unfolded state, the housing 14 and the housing 16 are combined to form the integrated ground plate on the outer side of the rotating shaft 13, and a length that is of the integrated ground plate and that is in the vertical direction is obviously greater than a length that is of the integrated ground plate and that is in the horizontal direction. Therefore, the first branch 43 arranged along the vertical direction may be longer than the second branch 45 arranged along the horizontal direction, so that the horizontal current and the vertical current of the housing ground plate are excited in a balanced manner. A difference between the first branch 43 and the second branch 45 can adapt to a difference between the length that is of the housing ground plate and that is in the vertical direction and the length that is of the housing ground plate and that is in the horizontal direction. Certainly, in this embodiment, it is not excluded that the integrated ground plate formed by combining the housing 14 and the housing 16 presents another specification in which the length in the vertical direction is less than the length in the horizontal direction. In this case, the first branch 43 arranged along the horizontal direction is larger than the second branch 45 arranged along the vertical direction, so that the horizontal current and the vertical current of the ground plate can be excited in a more balanced manner.

Embodiment 4

Figure 10A:
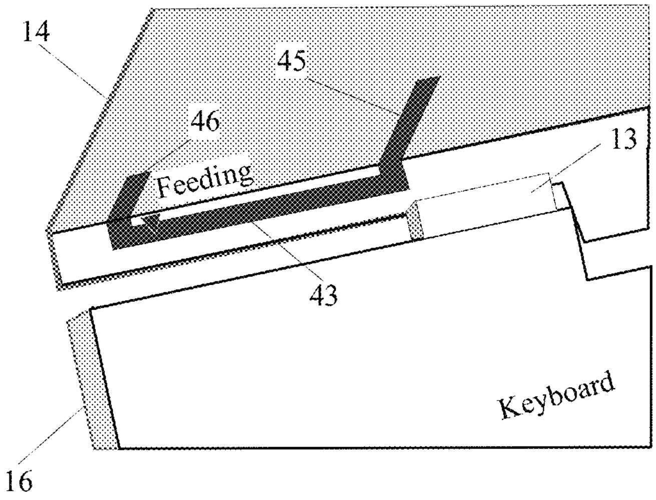
FIG. 10A and FIG. 10B show another slot antenna included in a foldable electronic device according to an embodiment of this application.
Figure 10B:
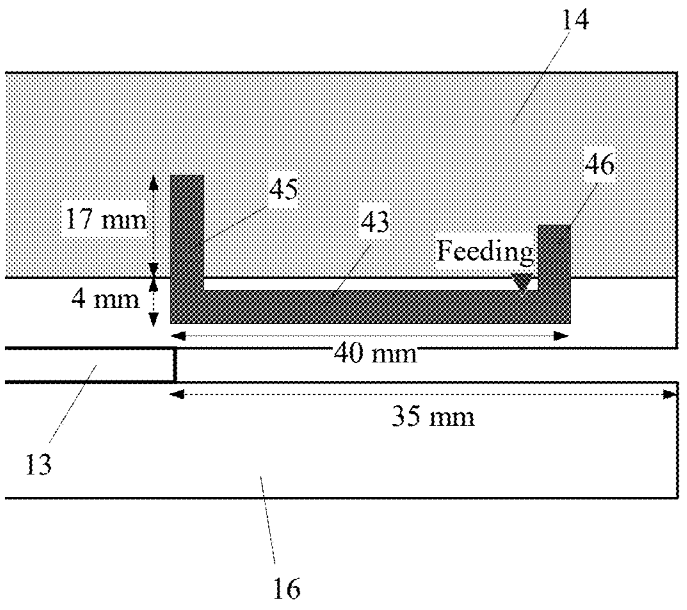

Based on the foregoing embodiments, as shown in FIG. 10A and FIG. 10B, the slot antenna may further include a third branch 46 formed by hollowing out the housing ground plate. Like the second branch 45, the third branch 46 may also be vertically connected to the first branch 43. The second branch 45 is vertically connected to one end of the first branch 43, and the third branch 46 is vertically connected to the other end of the first branch 43. On the first branch 43, the feed point may be disposed adjacent to the third branch 46, for example, may be disposed at a connection position between the third branch 46 and the first branch 43. The slot antenna is equivalent to a slot antenna formed by bending the L-shaped slot antenna provided in the foregoing embodiment at a feed point to add one vertical branch at the feed point. "Adjacent" may further mean that, along the first branch 43, a gap between the feed point and the third branch 46 is less than a specific distance value, for example, 5 mm.

The third branch 46 added at the feed point may be used for impedance tuning, so that resonance is enhanced and radiation efficiency is improved. The third branch 46 may be equivalent to an inductor, and the larger a size of the third branch 46 is, the larger an inductance value is. In actual application, a size of the third branch 46 is selected, so that impedance matching may be performed on the slot antenna operating in a specific frequency band. In this case, an antenna pattern is basically not affected.

The following describes simulation of the slot antenna shown in FIG. 10A with reference to the accompanying drawings. Antenna dimensions on which antenna simulation is based are as follows: A length of the first branch 43 is 40 mm, a length of the second branch 45 is 21 mm, and a length of the third branch 46 is 14 mm.

Figure 11A:
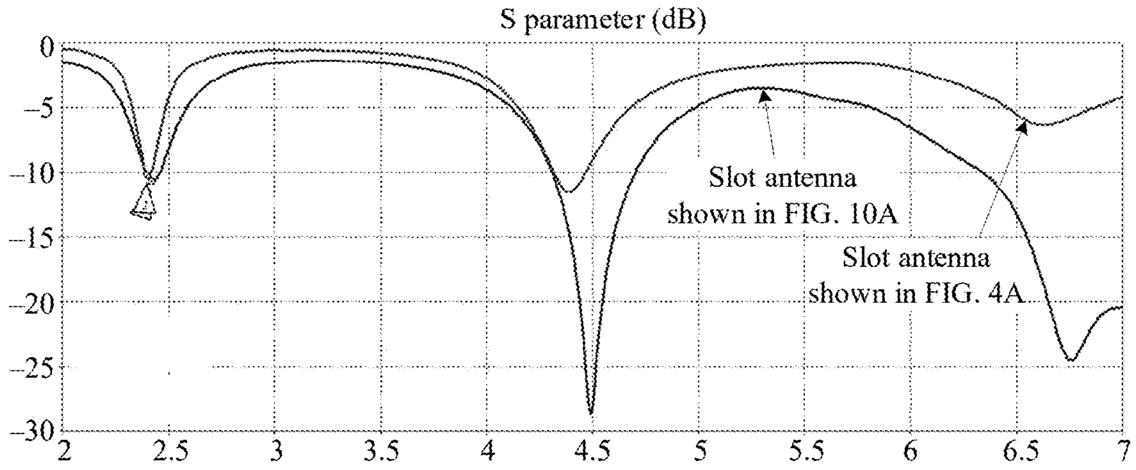
FIG. 11A shows S parameter curve simulation of the slot antenna shown in FIG. 10A and FIG. 10B.

FIG. 11A shows S parameter curve simulation of a slot antenna before and after a third branch 46 is added. As shown in FIG. 11A, the slot antenna may generate resonance in several operating frequency bands of 2.4 GHz, 4.5 GHz, and 6.7 GHz. In addition, a resonance depth of the slot antenna is greater after the third branch 46 is added, and antenna radiation is stronger, especially in a frequency band of 4.5 GHz where radiation is significantly enhanced. In addition to the operating frequency bands shown in FIG. 11A, the antenna provided in Embodiment 4 may further generate resonance in another frequency band. Specifically, the another frequency band may be set by adjusting the size of the antenna branch.

Figure 11B:
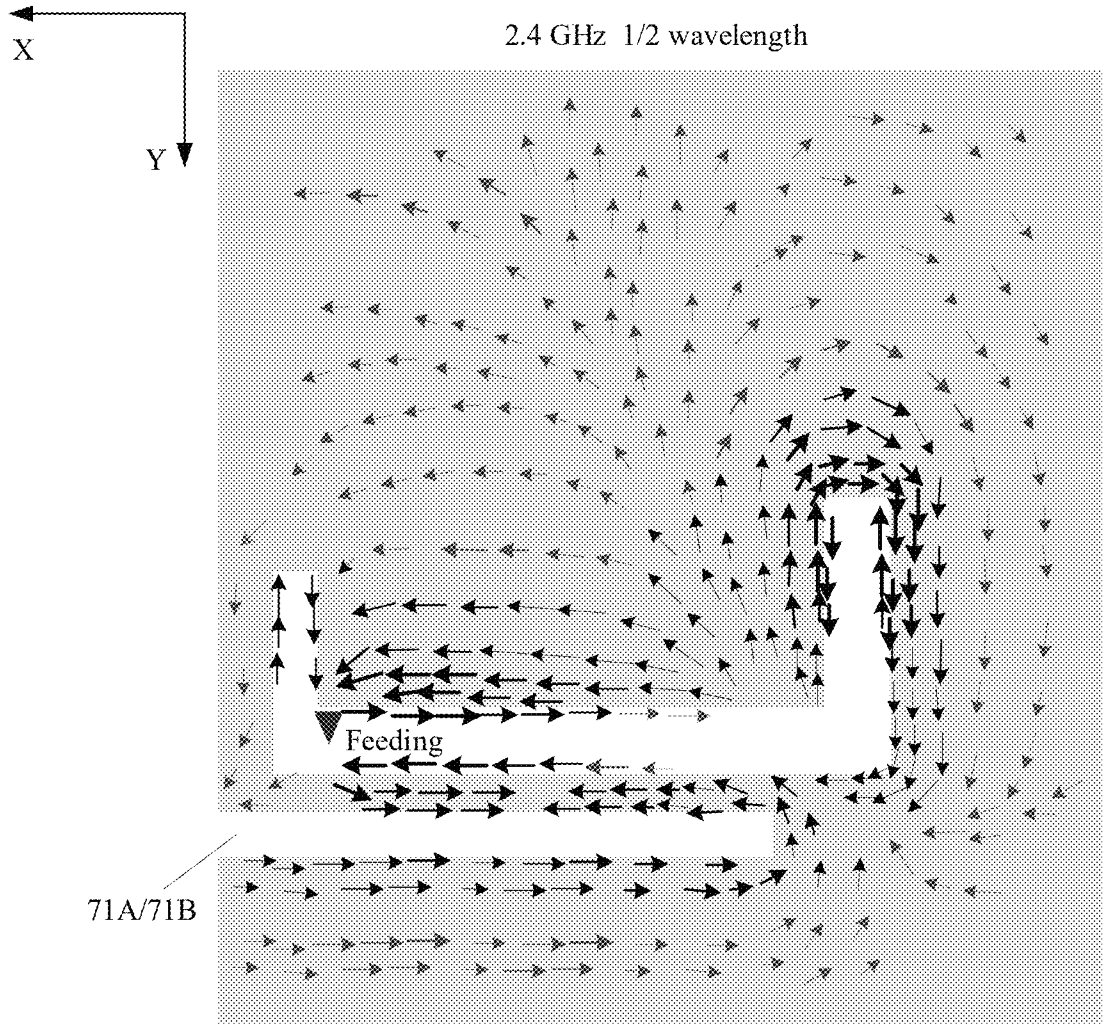
FIG. 11B to FIG. 11D show current distribution simulation of the slot antenna shown in FIG. 10A at operating frequencies of 2.4 GHz, 4.5 GHz, and 6.7 GHz.
Figure 11C:
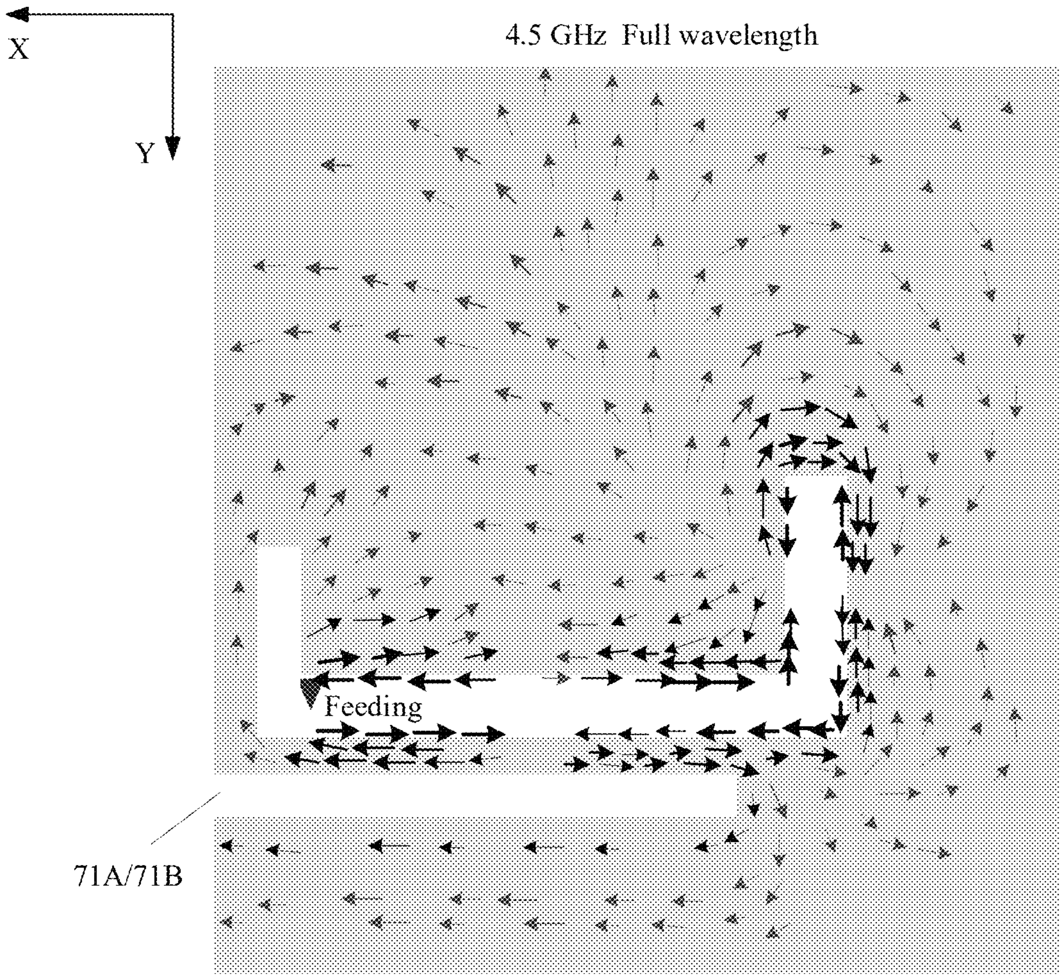
Figure 11D:
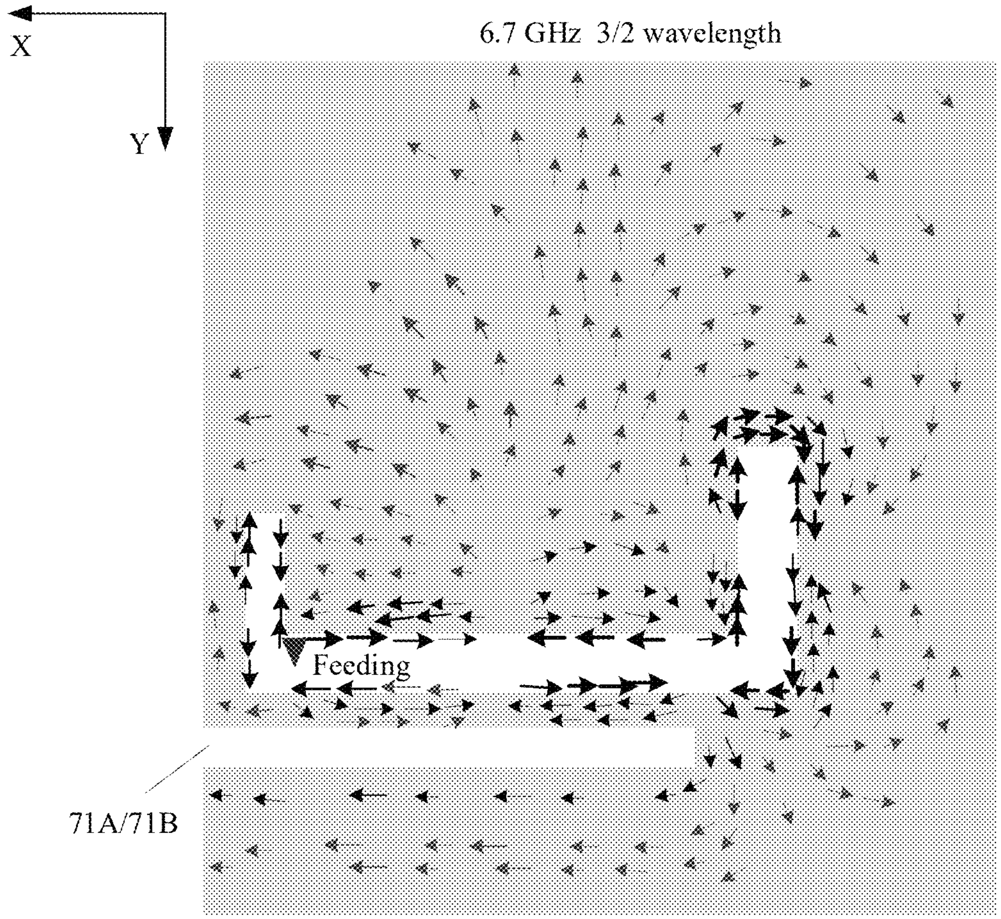

FIG. 11B to FIG. 11D show current distribution simulation of the slot antenna at operating frequencies of 2.4 GHz, 4.5 GHz, and 6.7 GHz. The slot antenna is a half-wavelength slot antenna at 2.4 GHz, the slot antenna is a full-wavelength slot antenna at 4.5 GHz, and the slot antenna is a 3/2-wavelength slot antenna at 6.7 GHz.

Figure 11E:
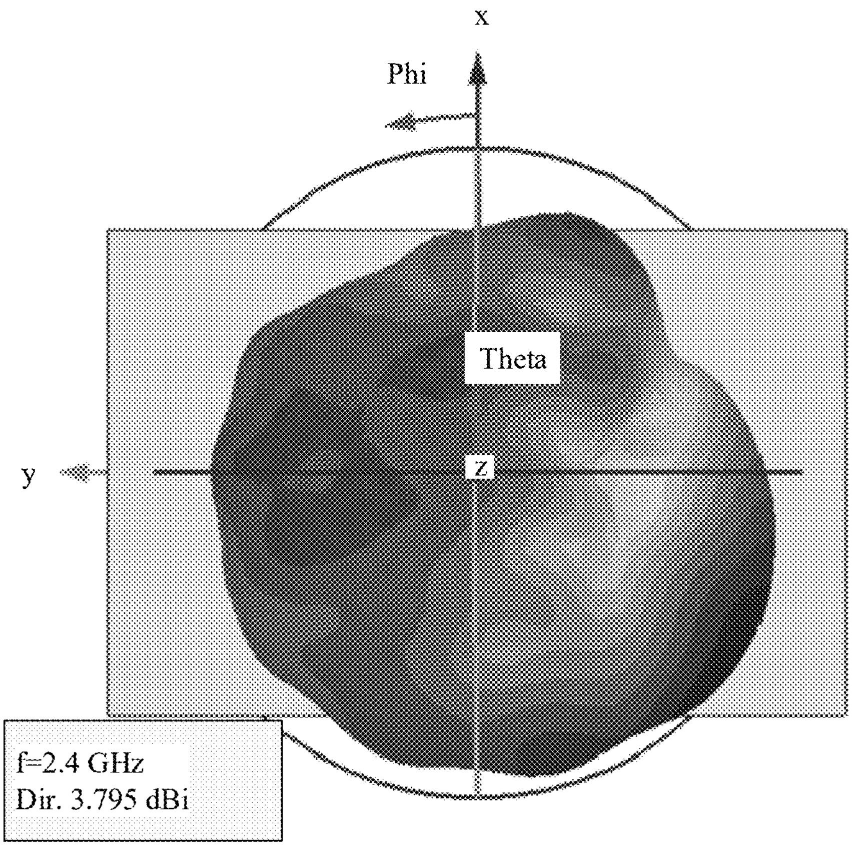
FIG. 11E shows radiation pattern simulation of the slot antenna shown in FIG. 10A at an operating frequency of 2.4 GH.

FIG. 11E shows radiation pattern simulation of the slot antenna shown in FIG. 10A at an operating frequency of 2.4 GH. A simulation situation at a position at which the foldable device is unfolded to 180° is used as an example of an antenna radiation pattern. It can be seen that adding the third branch 46 basically does not affect the antenna pattern of the slot antenna, and the antenna pattern of the slot antenna remains evenly covered.

Embodiment 5

Based on the foregoing embodiment, a slot 51 is formed through slotting at a specific position of the first branch 43, and an inductor is loaded in the slot 51. The inductor is loaded to achieve a tuning objective.

Figure 12A:
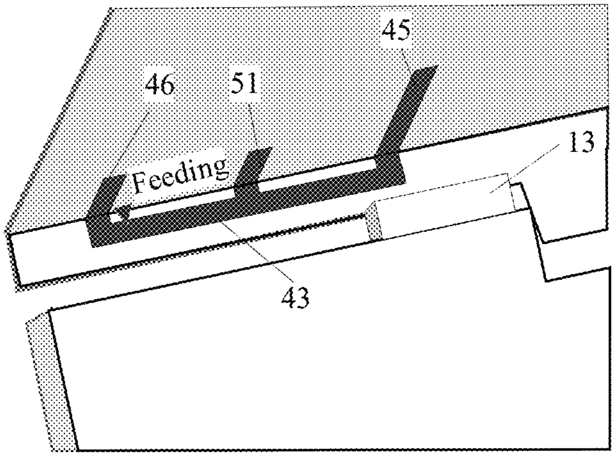
FIG. 12A and FIG. 12B show another slot antenna included in a foldable electronic device according to an embodiment of this application.
Figure 12B:
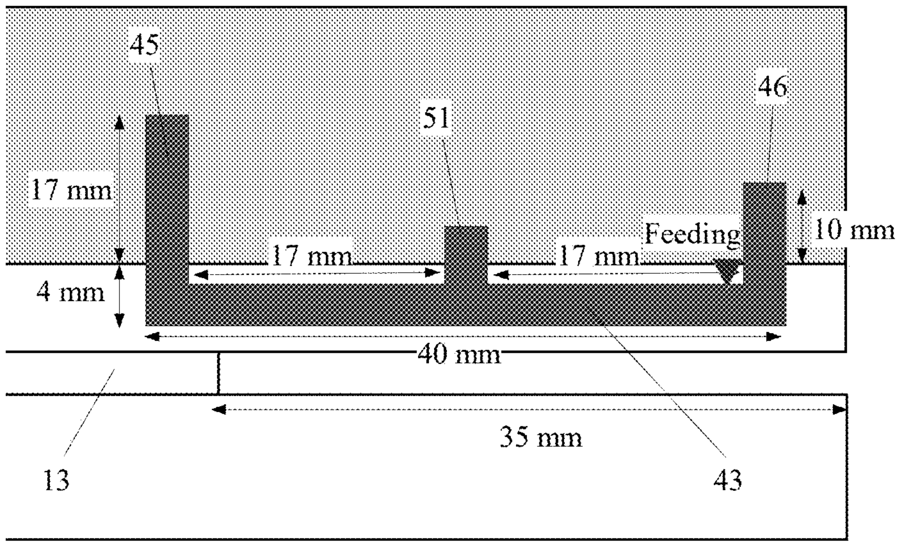
Figure 13:
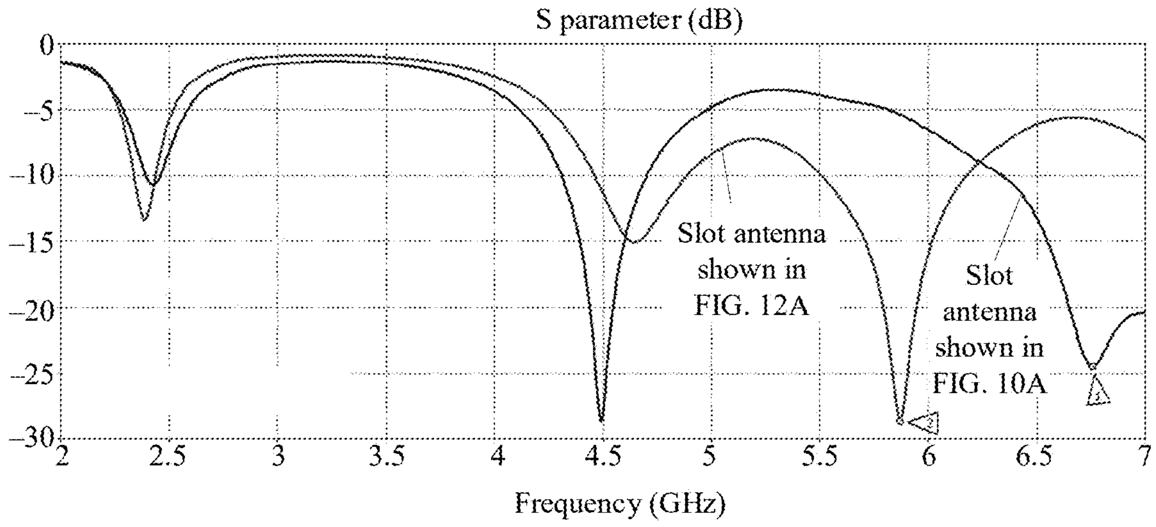
FIG. 13 shows one tuning effect of the slot antenna shown in FIG. 12A and FIG. 12B.

For example, as shown in FIG. 12A and FIG. 12B, a strong current point may be determined based on current distribution of a specific resonance, and at the strong current point, the slot 51 is provided and the inductor is loaded, to change a resonance position of the slot antenna provided in Embodiment 4, that is, to adjust an antenna frequency band. In this way, as shown in FIG. 13, an original 3/2 wavelength mode resonance at 6.7 GHz can be tuned to be in a 5G band (450 MHz to 6000 MHz). 450 MHz to 6000 MHz is a 5G frequency range 1 (Frequency Range 1, FR1).

Herein, the strong current point is a position of a strong current determined by analyzing current strength distribution. For a multi-band antenna, current distribution at different resonance frequencies may be viewed, to find a strong current point of each frequency. At a position of a strong current point of one resonance frequency, slotting is performed and an inductor is loaded, so that a resonance position of the resonance frequency can be changed effectively, and a tuning objective can be achieved. The strong current point may be one position range with high current intensity (for example, the current intensity exceeds a specific intensity value). Further, during selecting a slotting position, a strong current point of another resonance frequency needs to be considered to avoid, to avoid affecting radiation of the slot antenna at another resonance frequency.

The tuning is not limited to tuning of the resonance of 6.7 GHz, but may further be tuning of a resonance of another frequency. Specifically, the position at which the slot 51 is provided is changed, to change the tuning.

The following describes simulation of the slot antenna shown in FIG. 12A with reference to the accompanying drawings. Antenna dimensions on which antenna simulation is based are as follows: A length of the first branch 43 is 40 mm, a length of the second branch 45 is 21 mm, and a length of the third branch 46 is 14 mm.

Figure 14A:
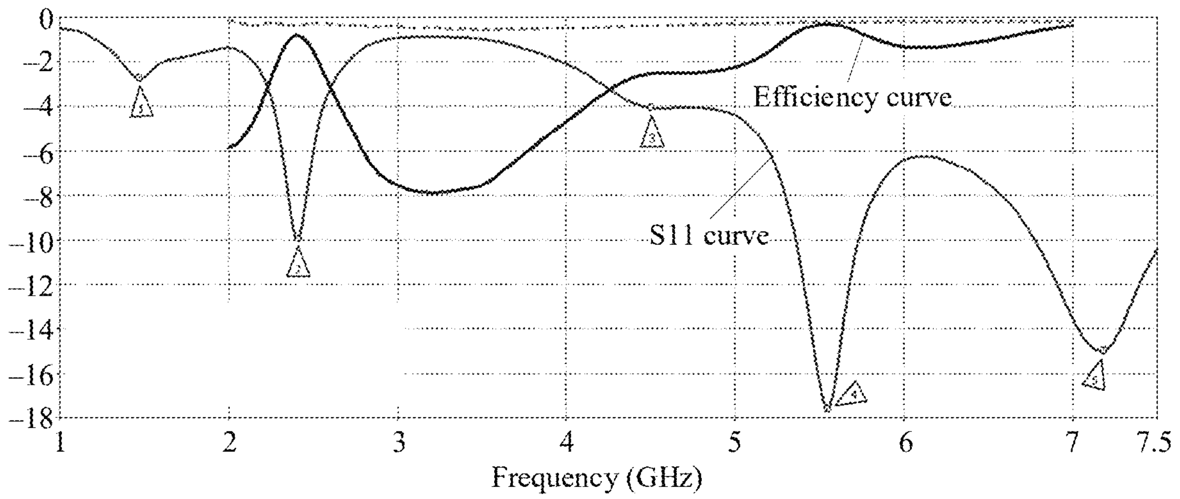
FIG. 14A shows S parameter curve simulation and efficiency curve simulation of the slot antenna shown in FIG. 12A and FIG. 12B.
Figure 14B:
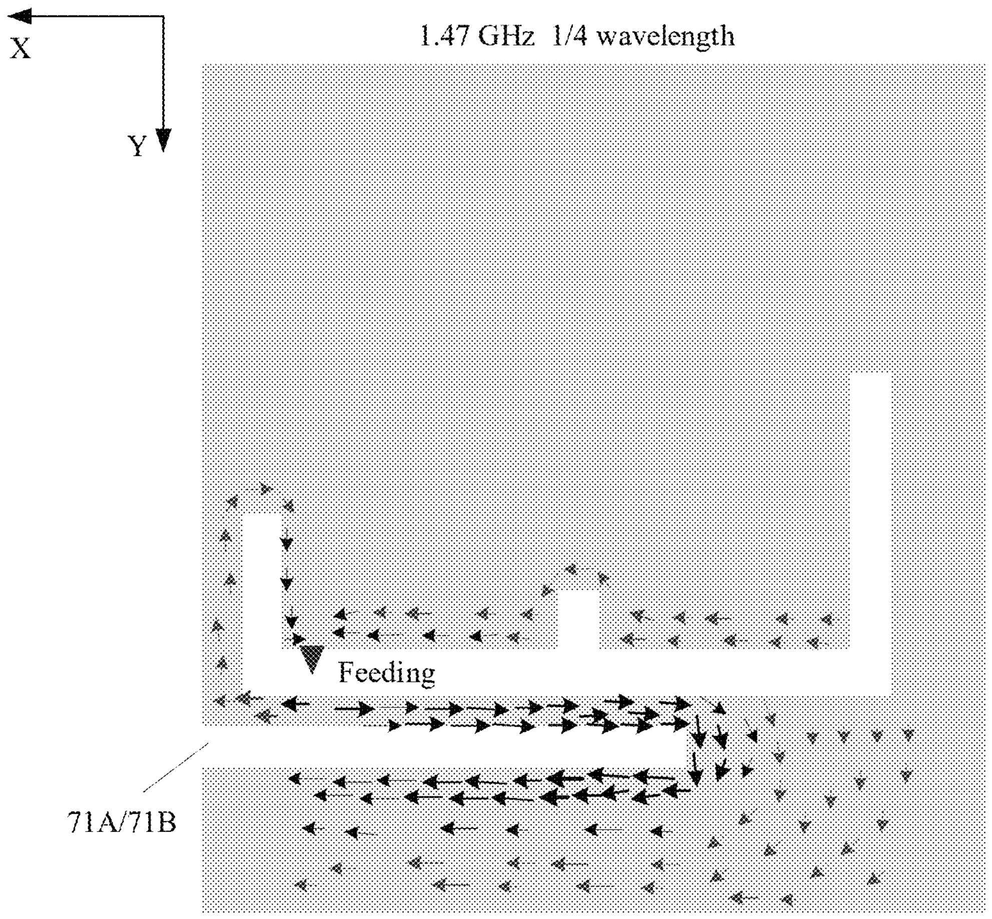
FIG. 14B to FIG. 14F show current distribution simulation of the slot antenna shown in FIG. 12A and FIG. 12B at operating frequencies of 1.47 GHz, 2.4 GHz, 4.5 GHz, 5.5 GHz, and 7.16 GHz.
Figure 14C:
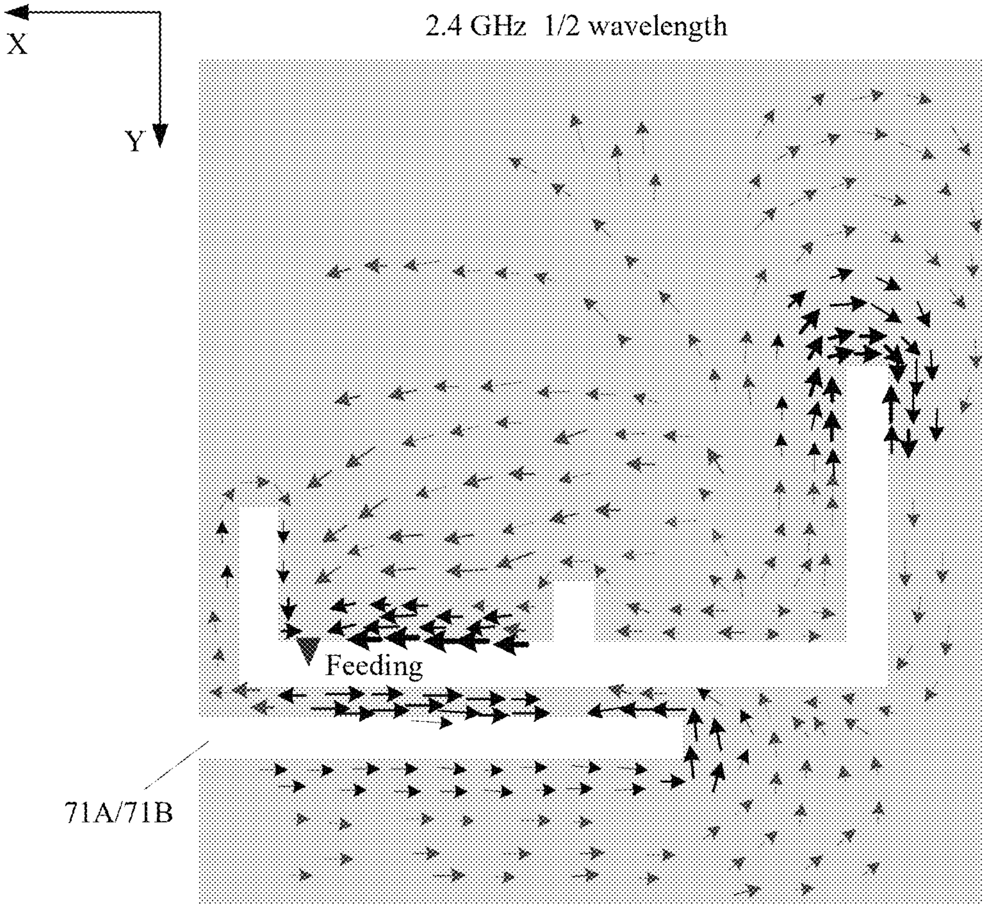
Figure 14D:
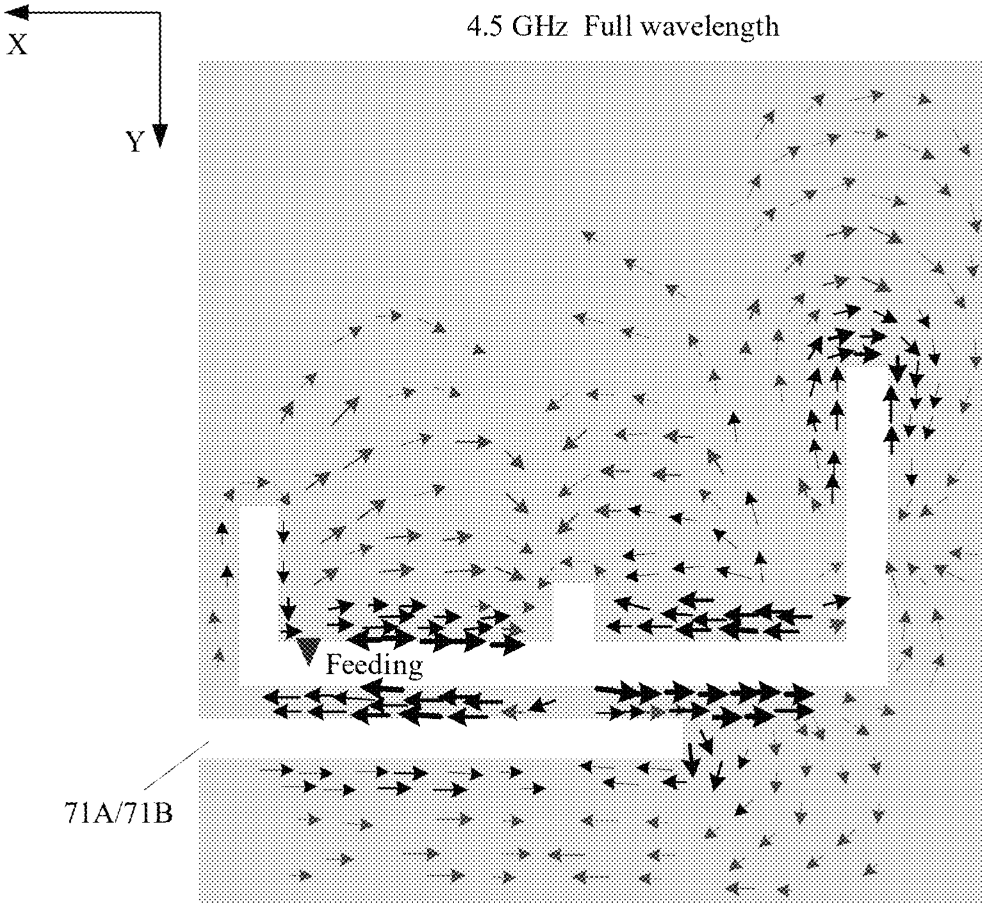
Figure 14E:
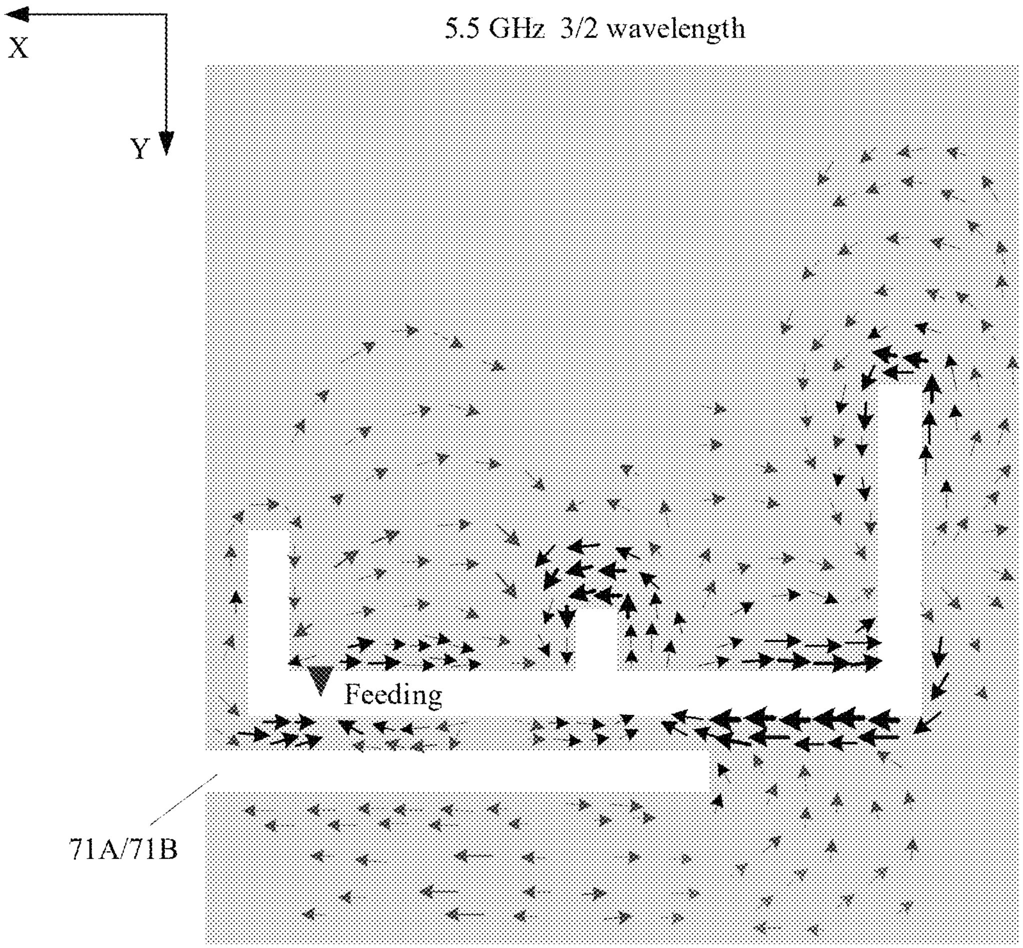
Figure 14F:
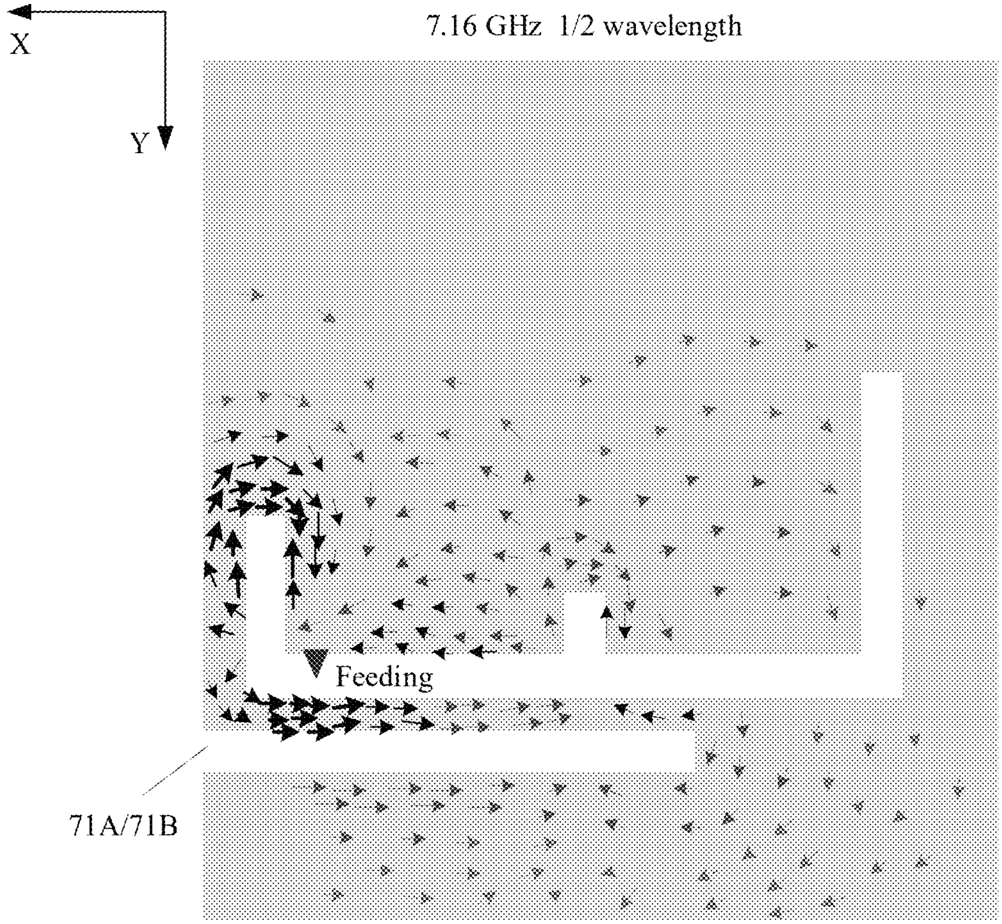
Figure 14G:
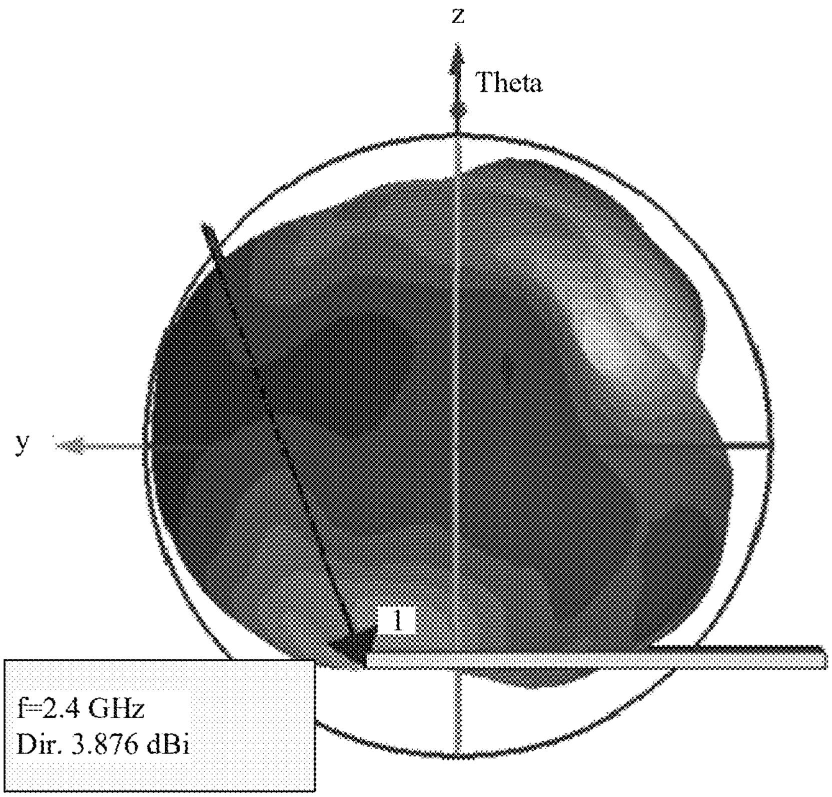
FIG. 14G to FIG. 14J show radiation pattern simulation of the slot antenna shown in FIG. 12A and FIG. 12B at operating frequencies of 2.4 GHz, 4.5 GHz, 5.5 GHz, and 7.16 GHz.
Figure 14H:
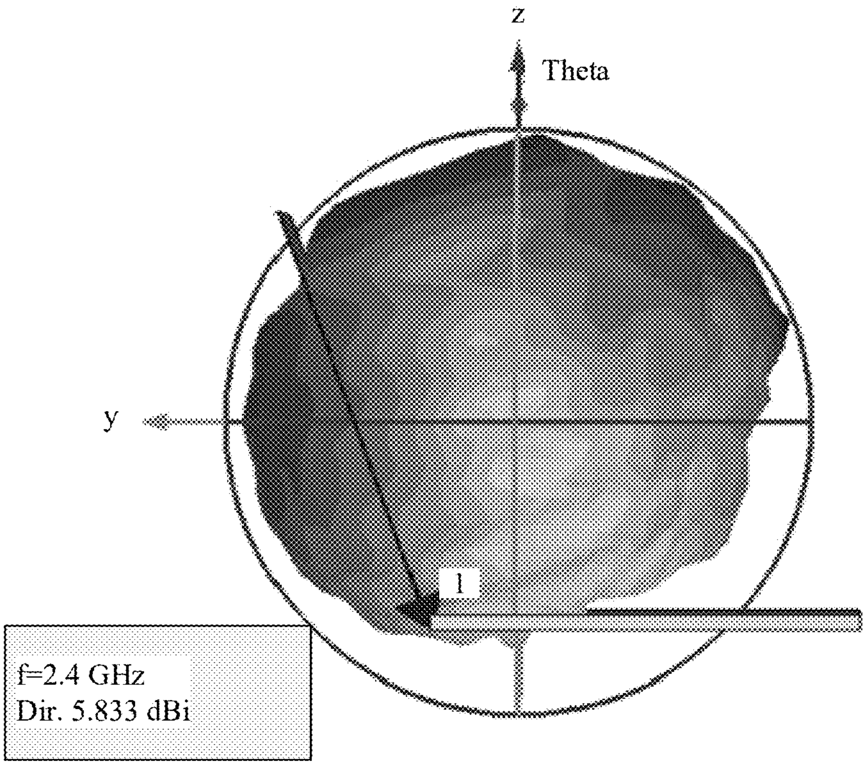
Figure 14I:
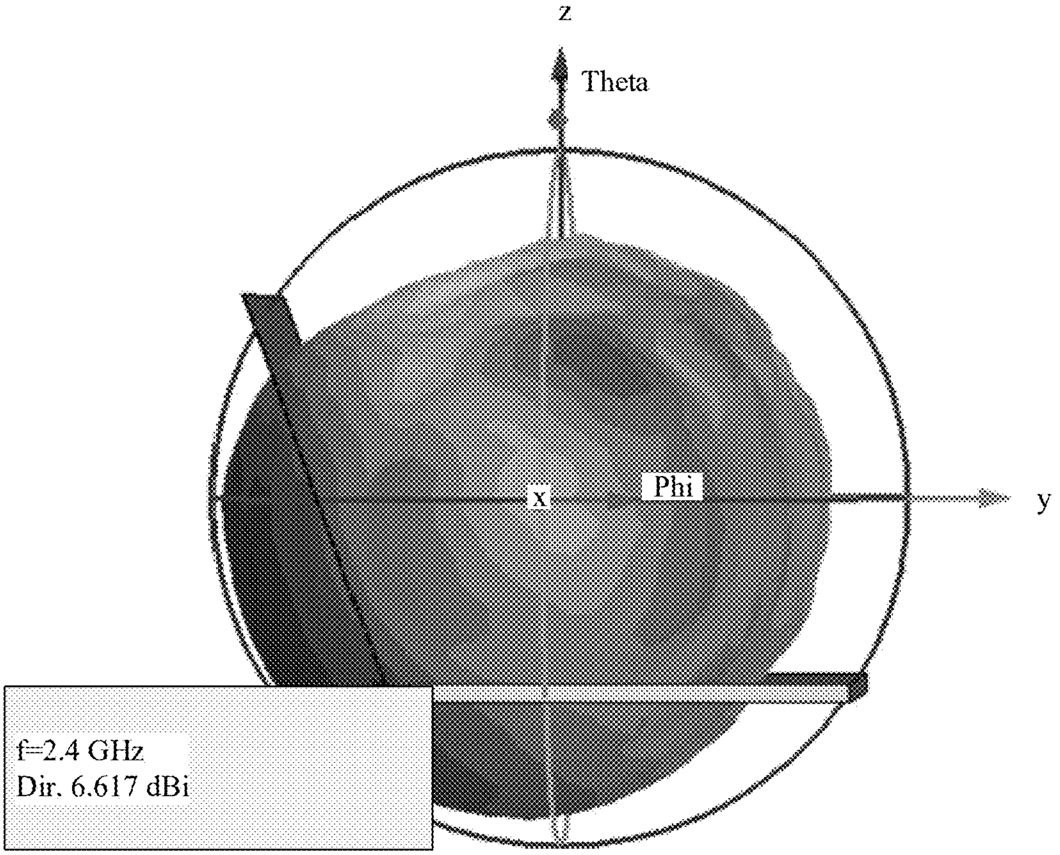
Figure 14J:
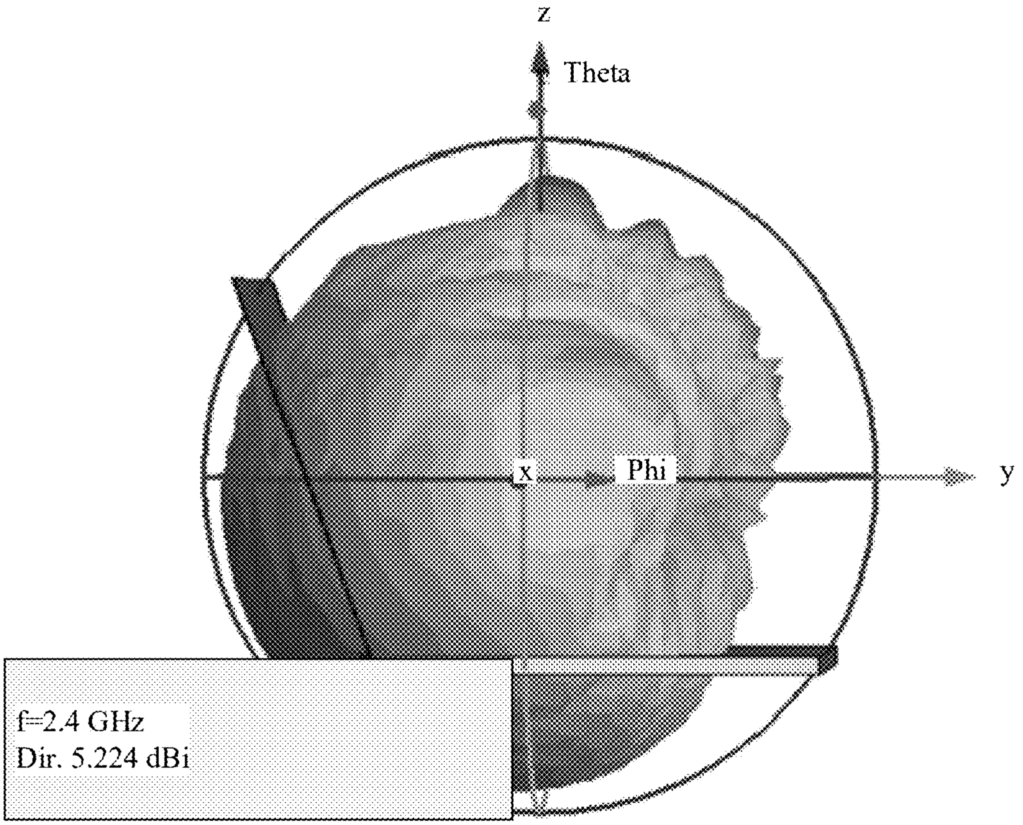

FIG. 14A shows S parameter curve simulation and efficiency curve simulation of the slot antenna shown in FIG. 12A. As shown in FIG. 14A, the slot antenna may generate resonance in operating frequency bands of 1.47 GHz, 2.4 GHz, 4.5 GHz, 5.5 GHz, and 7.16 GHz. Antenna radiation efficiency is high. Compared with the S parameter curve simulation of the slot antenna shown in FIG. 10A, the slot antenna in which the inductor-loaded slot 51 is provided and may cover more operating frequency bands.

FIG. 14B to FIG. 14F show current distribution simulation of the slot antenna shown in FIG. 12A at operating frequencies of 1.47 GHz, 2.4 GHz, 4.5 GHz, 5.5 GHz, 7.16 GHz. A slot 71A or a slot 71B that is on the outer side of the rotating shaft and that is excited at 1.47 GHz operates in a 1/4 wavelength mode, the slot antenna operates in a half wavelength mode at 2.4 GHz, the slot antenna operates in a full wavelength mode at 4.5 GHz, the slot antenna operates in a 3/2 wavelength mode at 5.5 GHz, and the slot antenna operates in the half wavelength mode at 7.16 GHz.

FIG. 14G to FIG. 14J show radiation pattern simulation of the slot antenna shown in FIG. 12A at operating frequencies of 2.4 GHz, 4.5 GHz, 5.5 GHz, and 7.16 GHz. A simulation situation at a position at which the foldable device is unfolded to 110° is used as an example of an antenna radiation pattern.

Figure 15:
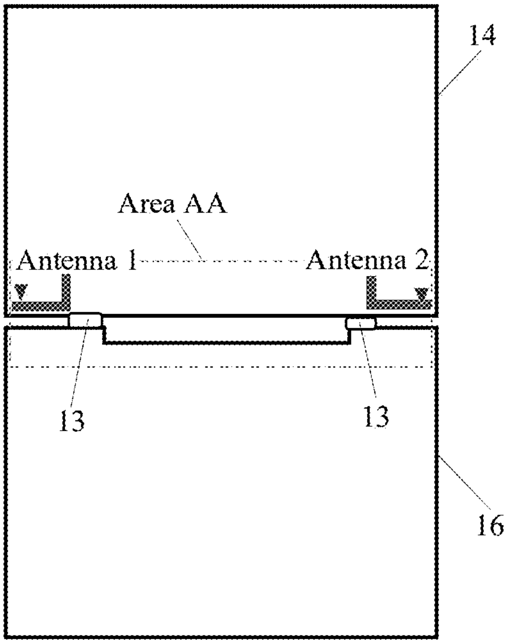
FIG. 15 shows a MIMO antenna included in a foldable electronic device according to this application.

The foldable electronic device may include a plurality of slot antennas provided in the foregoing embodiments, to implement a multiple-input multiple-output (multi input multi output, MIMO) antenna, for example, a wireless fidelity (wireless fidelity, Wi-Fi) MIMO antenna. As shown in FIG. 15, two slot antennas may be provided on an area that is on a housing ground plate and adjacent to a folding position and that is located on the outer side of the rotating shaft. One slot antenna is provided on a first outer side of the rotating shaft, and the other is provided on a second outer side of the rotating shaft. Regardless of whether the foldable electronic device has a single rotating shaft or a plurality of rotating shafts, the foldable electronic device has only two outer sides. A plurality of rotating shafts may be considered as a whole. On both the outer sides, the rotating shaft is connected to a housing to form an open slot that is closed at one end and open at the other end.

A manner of forming the slot antenna is not limited to hollowing out a metal housing. The slot antenna may alternatively be formed by hollowing out another metal ground plate disposed in the first body 11 or the second body 12. For example, when the foldable electronic device is a notebook computer with a non-metal ID, the housing 14 and the housing 16 are non-metal, and the slot antenna may be formed by hollowing out another metal ground plate adjacent to the folding position.

In addition to reducing the antenna directivity coefficient, the foldable electronic device including the slot antenna provided in embodiments of this application is also capable of limiting an antenna gain when antenna efficiency remains unchanged, so that the antenna gain meets related regulations of effective isotropic radiated power (effective isotropic radiated power, EIRP) and power spectrum density (power spectrum density, PSD). In this way, good wired conduction power is obtained, and over the air (OTA) performance of an electronic device is improved.

Herein, that the antenna branch is distributed along the side edge of the housing (or the housing ground plate) may mean that the antenna branch is adjacent to the side edge, or may further limit the antenna branch to being parallel to the side edge. "Adjacent" may mean that a distance from the antenna branch to the side edge does not exceed a specific distance value, for example, 10 mm. "Far away" may mean that the distance from the antenna branch to the side edge exceeds a specific distance value, for example, 40 mm.

In the foregoing embodiments, that the antenna branch is "adjacent" to the side edge of the housing (or the housing ground plate) may mean that a distance from the center point on the antenna branch to the side edge does not exceed a specific distance value, or an average distance from all points on the antenna branch to the side edge does not exceed a specific distance value, or a distance from a farthest point on the antenna branch to the side edge does not exceed a specific distance value.

In the foregoing embodiments, that the antenna branch is "far away" from the side edge of the housing (or the housing ground plate) may mean that the distance from the center point on the antenna branch to the side edge is not less than a specific distance value, or the average distance from all points on the antenna branch to the side edge is not less than a specific distance value, or a distance from a closest point on the antenna branch to the side edge is not less than a specific distance value.

"Open" and "closed" mentioned in the foregoing embodiments may be relative. "Closed" means grounded, and "open" means not grounded. Alternatively, "open" and "closed" mentioned in the foregoing embodiments may be relative to another conductor. "Closed" means electrically connected to another conductor, and "open" means not electrically connected to another conductor.

In addition, in the foregoing content of this application, a limitation on a position or a distance, for example, a feed point, a middle or a middle position, and a parallel position, is relative to a current state of the art, and is not strictly defined in a mathematical sense. For example, the feed point may be any point in a connection area (which may also be referred to as a connection position) between a feeder and a conductor. That one antenna branch is parallel to the side edge of the housing may mean that the vertical distance from a point on the antenna branch, for example, an end point at both ends or a midpoint, to the housing side edge is approximately equal or measured, in a specific distance measurement unit (for example, millimeter), to be a same distance value.

In this application, an operating wavelength in a specific wavelength mode (such as a half-wavelength mode) of an antenna may be a wavelength of a signal radiated by the antenna. For example, a suspended metal antenna in the half-wavelength mode may generate a resonance in a frequency band of 1.575 GHz, where an operating wavelength in the half-wavelength mode is a wavelength of a signal radiated by the antenna in the frequency band of 1.575 GHz. It should be understood that a wavelength of a radiated signal in the air may be calculated based on the following formula: Wavelength=Speed of light/Frequency, where the frequency is a frequency of the radiated signal. A wavelength of the radiated signal in a medium may be calculated based on the following formula: Wavelength=(Speed of light/$\sqrt{\varepsilon}$)/Frequency, where $\varepsilon$ is a relative dielectric constant of the medium, and the frequency is a frequency of the radiated signal. The gap and the slot in the foregoing embodiments may be filled with an insulating medium.

The "operating wavelength" mentioned in the foregoing embodiments may be a wavelength corresponding to a center frequency of a resonance frequency. For example, it is assumed that a center frequency of a B1 uplink frequency band (a resonance frequency is from 1920 MHz to 1980 MHz) is 1955 MHz. In this case, the operating wavelength may be a wavelength calculated based on the frequency of 1955 MHz. The "operating wavelength" is not limited to the wavelength calculated based on the center frequency, but may alternatively be a wavelength corresponding to a non-center frequency of the resonance frequency.

The foregoing descriptions are merely specific implementations of this application, but are not intended to limit the protection scope of this application. Any change or replacement readily figured out by a person skilled in the art within the technical scope disclosed in this application shall fall within the protection scope of this application. Therefore, the protection scope of this application shall be subject to the protection scope of the claims.

The invention claimed is:

1. A foldable electronic device comprising an antenna, wherein the foldable electronic device comprises a first body, a second body, and a rotating shaft connected to the first body and the second body, wherein the first body and the second body are rotatable around the rotating shaft, and the first body comprises a first metal housing, and the second body comprises a second metal housing;

the foldable electronic device further comprises a slot antenna formed by hollowing out a housing ground plate, wherein the slot antenna comprises a first branch and a second branch, the second branch is vertically connected to one end of the first branch, a feed point of the slot antenna is disposed on one of the first branch or the second branch, the slot antenna is distributed in an area that is on the housing ground plate and that is adjacent to a folding position, the first branch and the second branch are not both distributed along a side edge of the housing ground plate, and when one of the first branch and the second branch is distributed along the side edge of the housing ground plate, a gap between the other branch and the side edge of the housing ground plate is not less than ½ of an operating wavelength;

wherein the first metal housing and the second metal housing are two independent metal housings; and wherein when the foldable electronic device is in an unfolded state, the first metal housing and the second metal housing are in contact with each other and form a short circuit on an outer side of the rotating shaft, and the housing ground plate is an integrated ground plate formed on the outer side of the rotating shaft by combining the first metal housing and the second metal housing.

2. The foldable electronic device according to claim 1, wherein one of the first branch and the second branch is distributed along a housing side edge connected to the rotating shaft.

3. The foldable electronic device according to claim 1, wherein the rotating shaft is made of metal, and the slot antenna is also distributed on an outer side of the rotating shaft.

4. The foldable electronic device according to claim 1, wherein in the first branch and the second branch, one branch distributed along a longer side edge of the housing ground plate is longer than the other branch.

5. The foldable electronic device according to claim 4, wherein a difference between a ratio of a length of the one branch to a length of the other branch and a ratio of a length of the longer side edge of the housing ground plate to a length of a shorter side edge of the housing ground plate does not exceed a first value.

6. The foldable electronic device according to claim 1, wherein the folding position is not covered by an input/output panel with a signal shielding feature.

7. The foldable electronic device according to claim 1, wherein the slot antenna further comprises a third branch formed by hollowing out the housing ground plate, wherein the third branch is vertically connected to the other end of the first branch, and a gap between the feed point and the third branch is less than a second value.

8. The foldable electronic device according to claim 1, wherein the slot antenna further comprises a slot formed through slotting at a first position of the first branch, wherein an inductor is loaded in the slot, and the first position comprises a strong current point of a first resonance frequency of the slot antenna.

9. The foldable electronic device according to claim 1, wherein there are a plurality of slot antennas.

10. The foldable electronic device according to claim 9, wherein a quantity of slot antennas in the foldable electronic device is two, one slot antenna is provided on a first outer side of the rotating shaft, and the other slot antenna is provided on a second outer side of the rotating shaft.

11. A foldable electronic device comprising an antenna, wherein the foldable electronic device comprises a first body, a second body, and a rotating shaft connected to the first body and the second body, wherein the first body and the second body are rotatable around the rotating shaft, and the first body comprises a first metal housing, and the second body comprises a second metal housing;

wherein the foldable electronic device further comprises a slot antenna formed by hollowing out a housing ground plate, wherein the slot antenna comprises a first branch and a second branch, the second branch is vertically connected to one end of the first branch, a feed point of the slot antenna is disposed on one of the first branch or the second branch, the slot antenna is distributed in an area that is on the housing ground plate and that is adjacent to a folding position, the first branch and the second branch are not both distributed along a side edge of the housing ground plate, and when one of the first branch and the second branch is distributed along the side edge of the housing ground plate, a gap between the other branch and the side edge of the housing ground plate is not less than ½ of an operating wavelength; and wherein the first metal housing and the second metal housing are two parts of one entire metal housing.

12. The foldable electronic device according to claim 11, wherein the housing ground plate is the entire metal housing, and the entire metal housing is bendable at the rotating shaft.

13. The foldable electronic device according to claim 12, wherein one of the first branch or the second branch is distributed along the folding position.

14. The foldable electronic device according to claim 11, wherein one of the first branch or the second branch is distributed along the folding position.

15. A foldable electronic device comprising:

an input/output panel having a signal shielding feature; and a first body, a second body, and a rotating shaft connected to the first body and the second body, wherein the first body and the second body are rotatable around the rotating shaft, and the first body comprises a first metal housing, and the second body comprises a second metal housing;

wherein the foldable electronic device further comprises a plurality of slot antennas formed by hollowing out a housing ground plate, wherein the plurality of slot antennas comprise a first slot antenna, the first slot antenna comprises a first branch and a second branch, the second branch is vertically connected to one end of the first branch, a feed point of the first slot antenna is disposed on one of the first branch or the second branch, the first slot antenna is distributed in an area that is on the housing ground plate and that is adjacent to a folding position, the first branch and the second branch are not both distributed along a side edge of the housing ground plate, and when one of the first branch and the second branch is distributed along the side edge of the housing ground plate, a gap between the other branch and the side edge of the housing ground plate is not less than ½ of an operating wavelength;

wherein the first metal housing and the second metal housing are two independent metal housings; and wherein when the foldable electronic device is in an unfolded state, the first metal housing and the second metal housing are in contact with each other and form a short circuit on an outer side of the rotating shaft, and the housing ground plate is an integrated ground plate formed on the outer side of the rotating shaft by combining the first metal housing and the second metal housing.

16. The foldable electronic device according to claim 15, wherein one of the first branch or the second branch is distributed along a housing side edge connected to the rotating shaft.

17. The foldable electronic device according to claim 15, wherein the rotating shaft is made of metal, and the first slot antenna is also distributed on an outer side of the rotating shaft.

18. The foldable electronic device according to claim 15, wherein in the first branch and the second branch, one branch distributed along a longer side edge of the housing ground plate is longer than the other branch.

19. The foldable electronic device according to claim 18, wherein a difference between a ratio of a length of the one branch to a length of the other branch and a ratio of a length of the longer side edge of the housing ground plate to a length of a shorter side edge of the housing ground plate does not exceed a first value.

20. The foldable electronic device according to claim 15, wherein the folding position is not covered by the input/output panel.

* * * * *